United States Patent
Wang et al.

(10) Patent No.: US 9,709,839 B2
(45) Date of Patent: Jul. 18, 2017

(54) LIQUID CRYSTAL ELECTRONIC CURTAIN AND DRIVING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Lihua Wang, Shanghai (CN); Xiaoping Sun, Shanghai (CN); Xiaofei She, Shanghai (CN); Conghua Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 111 days.

(21) Appl. No.: 14/735,045

(22) Filed: Jun. 9, 2015

(65) Prior Publication Data
US 2016/0178949 A1    Jun. 23, 2016

(30) Foreign Application Priority Data
Dec. 23, 2014   (CN) .......................... 2014 1 0835312

(51) Int. Cl.
G02F 1/1333 (2006.01)
G02F 1/1343 (2006.01)
G02F 1/1345 (2006.01)
G06F 3/041 (2006.01)
G06F 3/044 (2006.01)

(52) U.S. Cl.
CPC .... *G02F 1/13338* (2013.01); *G02F 1/134309* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2011/0102730 A1* | 5/2011 | Lee ...................... | G02F 1/13718 349/175 |
| 2012/0162104 A1* | 6/2012 | Chang ................... | G06F 3/0412 345/173 |
| 2014/0111470 A1* | 4/2014 | Wu .................... | G02F 1/134309 345/174 |

FOREIGN PATENT DOCUMENTS

| CN | 102809868 A | 12/2012 |
|---|---|---|
| CN | 102955637 A | 3/2013 |

\* cited by examiner

*Primary Examiner* — Ryan Crockett
(74) *Attorney, Agent, or Firm* — Alston & Bird LLP

(57) ABSTRACT

A liquid crystal electronic curtain is disclosed. The liquid crystal electronic curtain includes a liquid crystal layer between first and second substrates. The curtain also includes a polarizer on one of a side of the first substrate away from the second substrate, and a side of the second substrate away from the first substrate. The curtain also includes a first electrode layer on a side of the first substrate facing the second substrate. The first electrode layer includes touch display units, and first electrode leads, each connected with one of the touch display units. The touch display units are connected with detection circuits via the first electrode leads. The curtain also includes a second electrode layer disposed on a side of the second substrate facing the first substrate, a driving circuit, and a second electrode lead, where the driving circuit is connected with the second electrode lead.

12 Claims, 22 Drawing Sheets

LIQUID CRYSTAL ELECTRONIC CURTAIN AND DRIVING METHOD THEREOF

CROSS-REFERENCES TO RELATED APPLICATIONS

This application claims the benefit of priority to Chinese Patent Application No. 201410835312.4, filed with the Chinese Patent Office on Dec. 23, 2014 and entitled "LIQUID CRYSTAL ELECTRONIC CURTAIN AND DRIVING METHOD THEREOF", the content of which is incorporated herein by reference in its entirety.

TECHNICAL FIELD

The present application relates to the field of display technologies, in particular to a liquid crystal electronic curtain and a driving method thereof.

BACKGROUND OF THE INVENTION

With the rapid development of sciences and technologies, electronic curtains have been widely used increasingly. In comparison with a traditional curtain only capable of shielding light and somewhat adjusting surrounding environment, a liquid crystal electronic curtain can implement effects of both light penetration and privacy protection simultaneously.

In the related art, the liquid crystal electronic curtain is generally formed by a liquid crystal smart film. The liquid crystal smart film, as a smart film, may be directly adhered onto glass, and present a transparent state or a foggy state after being applied with a voltage, to implement user requirements for both light penetration and privacy protection. Even when the smart film is not transparent, the smart film also enables a nice daylighting effect and can insulate and reflect the heat energy of the light, so that indoor temperature may be maintained warm in winter and cool in summer, thereby achieving effects of energy saving and environment protection. As such, the liquid crystal smart film implements a film photoelectric function through optical characteristics of a liquid crystal.

However, there is a user need to control the liquid crystal electronic curtain to present the transparent state or the foggy state by regions. However, since the existing liquid crystal electronic curtain does not have a touch function, such need cannot be achieved, causing inconvenience for the user in use.

BRIEF SUMMARY OF THE INVENTION

One inventive aspect is a liquid crystal electronic curtain. The liquid crystal electronic curtain includes a first substrate, a second substrate disposed opposite to the first substrate, and a liquid crystal layer between the first substrate and the second substrate. The curtain also includes a polarizer disposed on one of a side of the first substrate away from the second substrate, and a side of the second substrate away from the first substrate. The curtain also includes a first electrode layer disposed on a side of the first substrate facing the second substrate. The first electrode layer includes a plurality of touch display units disposed separately from each other, and a plurality of first electrode leads, where each of the first electrode leads is connected with one of the touch display units, and where the touch display units are connected with a plurality of detection circuits via the plurality of first electrode leads leading out from an edge of the first substrate The curtain also includes a second electrode layer disposed on a side of the second substrate facing the first substrate, a driving circuit, and a second electrode lead, where the driving circuit is connected with the second electrode lead, and where the second electrode lead is connected to the second electrode layer.

Another inventive aspect is a method of driving a liquid crystal electronic curtain. The liquid crystal electronic curtain includes a first substrate, a second substrate disposed opposite to the first substrate, and a liquid crystal layer between the first substrate and the second substrate. The curtain also includes a polarizer disposed on one of a side of the first substrate away from the second substrate, and a side of the second substrate away from the first substrate. The curtain also includes a first electrode layer disposed on a side of the first substrate facing the second substrate. The first electrode layer includes a plurality of touch display units disposed separately from each other, and a plurality of first electrode leads, where each of the first electrode leads is connected with one of the touch display units, and where the touch display units are connected with a plurality of detection circuits via the plurality of first electrode leads leading out from an edge of the first substrate The curtain also includes a second electrode layer disposed on a side of the second substrate facing the first substrate, a driving circuit, and a second electrode lead, where the driving circuit is connected with the second electrode lead, and where the second electrode lead is connected to the second electrode layer. The driving method includes applying a common electrode signal to the second electrode layer, applying different voltage signals to the plurality of touch display units according to a preset condition to control rotation of liquid crystal molecules of the liquid crystal layer, and detecting changes of current signals flowing through the touch display units by the detection circuits. The method also includes determining a touched region according to the changes of the current signals, and at least one of applying a voltage signal to the touch display unit corresponding to the touched region, and stop applying the voltage signal to the touch display unit corresponding to the touched region, to switch the touched region of the liquid crystal electronic curtain to a transparent state or to a foggy state.

BRIEF DESCRIPTION OF THE DRAWINGS

Other features, objects and advantages of the present disclosure will become apparent from the following detailed description made to nonrestrictive embodiments by reading the accompanying drawings below, in which.

DETAILED DESCRIPTION OF THE PREFERRED EMBODIMENTS

The present disclosure will be further illustrated in detail below in conjunction with the accompanying drawings and embodiments. It may be understood that specific embodiments described herein are merely for explaining the present disclosure rather than limiting the present disclosure. Additionally, it is noted that merely partial contents associated with the present disclosure rather than all contents are illustrated in the accompanying drawings for ease of description, and identical or similar reference numbers in the accompanying drawings are used for representing identical or similar elements or elements having identical or similar functions.

Figure 1A:
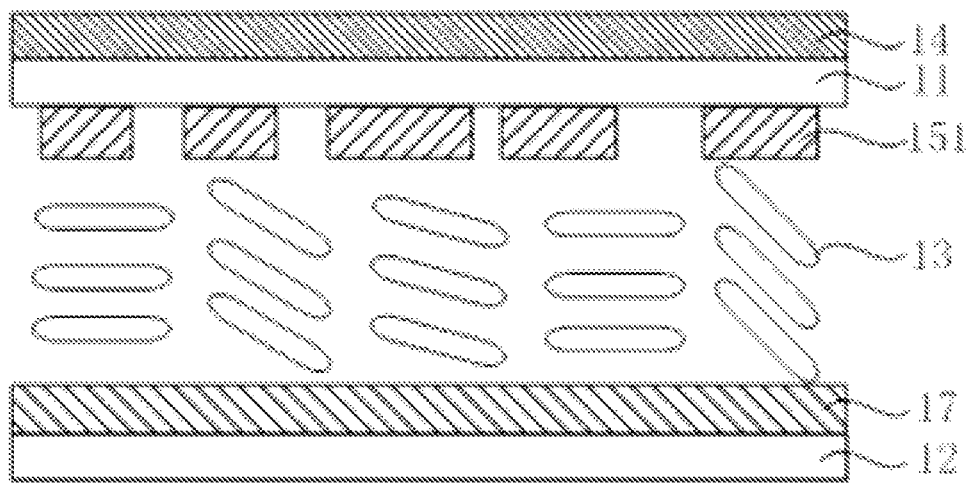
FIG. 1A is a schematic diagram of the sectional structure of a liquid crystal electronic curtain when being powered on according an embodiment of the present invention.
Figure 1B:
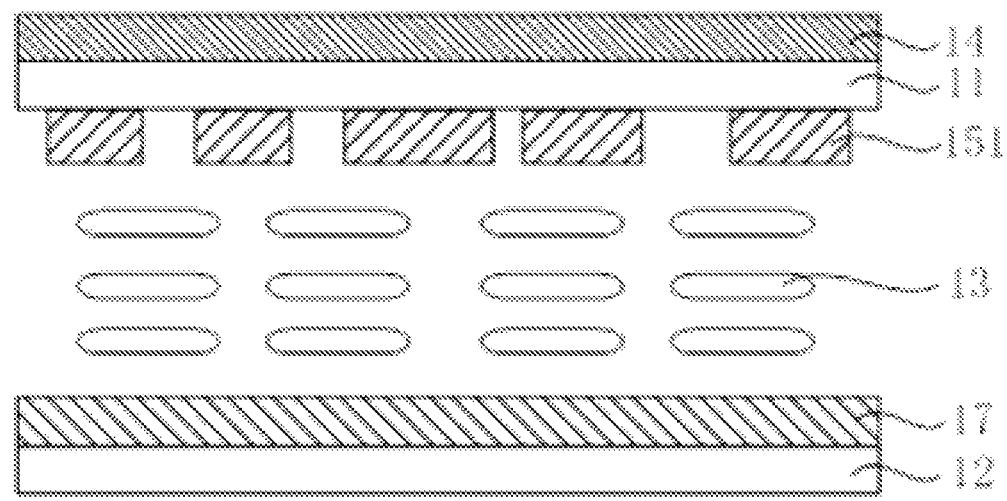
FIG. 1B is a schematic diagram of the sectional structure of a liquid crystal electronic curtain when being powered off according an embodiment of the present invention.
Figure 1C:
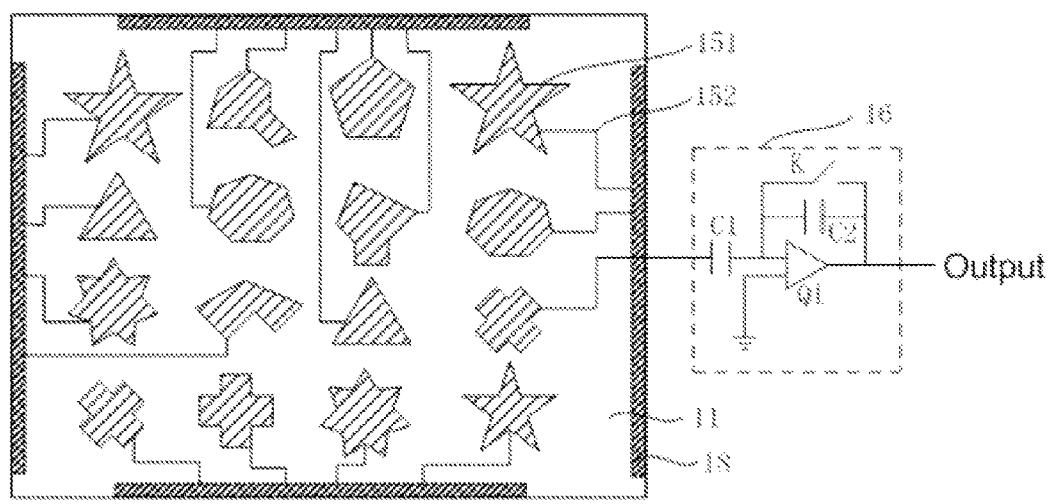
FIG. 1C is a top view of the first electrode layer of a liquid crystal electronic curtain provided by an embodiment of the present invention.

Referring to FIGS. 1A and 1B, FIG. 1A is a schematic diagram of the sectional structure of a liquid crystal electronic curtain when being powered on according an embodiment of the present invention, and FIG. 1B is a schematic diagram of the sectional structure of a liquid crystal electronic curtain when being powered off according an embodiment of the present invention. The liquid crystal electronic curtain according to an embodiment of the present invention includes: a first substrate 11, a second substrate 12 disposed opposite to the first substrate 11, and a liquid crystal layer 13 between the first substrate 11 and the second substrate 12; a polarizer 14 disposed on a side of the first substrate 11 that is away from the second substrate; a first electrode layer disposed on a side of the first substrate 11 that faces the second substrate, where the first electrode layer includes a plurality of touch display units 151 disposed separately from each other and a plurality of first electrode leads 152 (as shown in FIG. 1C), each of the first electrode leads 152 is connected with one of the touch display units 151, and the plurality of the touch display units 151 are respectively connected with a plurality of detection circuits 16 (as shown in FIG. 1C) via the plurality of first electrode leads 152 leading out from an edge of the first substrate 11; a second electrode layer 17 disposed on a side of the second substrate 12 that faces the first substrate 11; and a driving circuit 19 and a second electrode lead 172, the driving circuit is connected with the second electrode lead. In the present embodiment, referring to FIG. 1A, when an alternate current voltage signal is applied to the second electrode layer 17 and different direct current voltage signals are applied to the plurality of touch display units 151 of the first electrode layer, electric fields having different intensities and directions are formed in the second electrode layer and the plurality of touch display units, to rotate liquid crystal molecules, and the liquid crystal molecules in different positions will be in a horizontal state, a vertical state, or a disordered arrangement state between the horizontal stage and the vertical state, so that a polarization direction of natural light penetrating the liquid crystal layer is changed, and after passed through the polarizer 14, the natural light has irregularity in different regions, and thus the liquid crystal electronic curtain is in a foggy state which is not transparent. Referring to FIG. 1B, when an alternate current voltage signal is applied to second electrodes of the second electrode layer 17 and no direct current voltage signals are applied to the plurality of touch display units 151, no electric field is formed in the liquid crystal layer, so that the liquid crystal molecules will be in a horizontal ordered arrangement state, thus unchanging a polarization direction of natural light penetrating the liquid crystal layer, and after passed through the polarizer 14, the natural light having the polarization direction consistent with a transmission axis of the polarizer 14 will pass through, so that the liquid crystal electronic curtain is in a transparent state. Since each of the first electrode leads 152 is connected with one of the touch display units 151, different direct current voltage signals or no direct current voltage signal may be applied to the plurality of touch display units 151 according to a preset condition. The liquid crystal electronic curtain is in a foggy state in a position where a direct current voltage signal is applied to the touch display unit 151, and the liquid crystal electronic curtain is in a transparent state in a position where no direct current voltage signal is applied to the touch display unit 151. The touch display unit 151 may be of a regular shape or an irregular shape. For example, the touch display unit 151 may include at least one of block first electrodes, or, the touch display unit comprises a plurality of block first electrodes which are connected with each other by the first electrode lead, and the plurality of touch display units 151 are arranged in an array. The block first electrode may be of a regular square shape, a regular rectangle shape, a regular circular shape, a regular triangle shape or a regular trapezoid shape and so on, or may also be of an irregular pentagon, or an irregular circular shape, or an irregular circular shape or any combination thereof.

Referring to FIG. 1C, FIG. 1C is a top view of the first electrode layer of a liquid crystal electronic curtain provided by an embodiment of the present invention. FIG. 1C schematically illustrates a first electrode layer disposed on a side of the first substrate 11 that faces the second substrate 12 (as shown in FIG. 1A), and the first electrode layer includes a plurality of touch display units 151 disposed separately from each other and a plurality of first electrode leads. In the present embodiment, the touch display unit 151 is formed of a single block first electrode, and the block first electrode has various shapes, for example, the block first electrode may be of a regular square shape, a regular rectangle shape, a regular circular shape, a regular triangle shape or a regular trapezoid shape and so on, or may also be of an irregular pentagon, or an irregular circular shape, or an irregular circular shape or any combination thereof. Each of the first electrode leads 152 is connected with one of the touch display units 151, and the plurality of the touch display units 151 are respectively connected with a plurality of detection circuits 16 via the plurality of first electrode leads 152 leading out from an edge of the first substrate 11, and the first electrode lead 152 may be connected with an Integrated Circuit (IC) chip by a Flexible Printed Circuit Board (FPCB) or may also be directly connected with the IC chip 18 on the first substrate 11 so as to apply a voltage signal to the touch display unit 151 connected with the first electrode lead 152.

The detection circuit 16 may include a first capacitor C1, a second capacitor C2, a switch K and an amplifier Q1, where, a first electrode plate of the first capacitor C1 is connected with the first electrode lead 152, a second electrode plate of the first capacitor C1 is connected with a first input terminal of the amplifier Q1 and a first electrode plate of the second capacitor C2, a second electrode plate of the second capacitor Q2 is connected with an output terminal of the amplifier Q1, the switch K is connected in parallel with the second capacitor C2, and a second input terminal of the amplifier Q1 is connected with the ground. It is noted that FIG. 1C schematically illustrates only one detection circuit 16 connected with the touch display unit 151 by the first electrode lead 152, but actually each of the touch display units 151 is connected with one of the detection circuits 16 by the first electrode lead 152, which is not limited by Figures in the present disclosure.

Figure 1D:
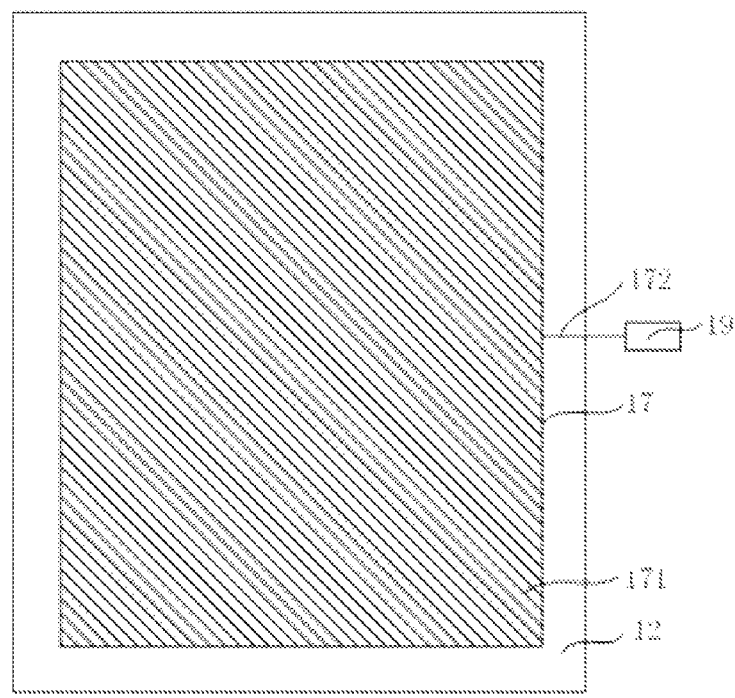
FIG. 1D is a top view of the second electrode layer of a liquid crystal electronic curtain provided by an embodiment of the present invention.

Referring to FIG. 1D, FIG. 1D is a top view of the second electrode layer of a liquid crystal electronic curtain provided by an embodiment of the present invention. In the present embodiment, the second electrode layer 17 includes a second electrode 171 and a second electrode lead 172, where, the second electrode 171 is connected with a driving circuit 19 by the second electrode lead 172 to apply a voltage signal to the second electrode 171 connected with the second electrode lead 172. In the present embodiment, the second electrode 171 is a planar second electrode. In additional embodiments of the present invention, the second electrode may also be a group of electrodes formed of the plurality of electrodes disposed separately from each other.

In the present embodiment, based on the detected change of current flowing through the detection circuit 16, it is possible to determine whether the touch display unit 151 connected with the detection circuit 16 is touched, and if it is detected that a certain touch display unit 151 is touched, then it is determined whether a voltage signal is applied to the touch display unit 151; and further, if a voltage signal is applied to the touch display unit 151, then the region corresponding to the touch display unit 151 is now in a foggy state, and in this case, the voltage signal applied to the touch display unit 151 then is cut off in order to switch the region corresponding to the touch display unit 151 from the foggy state to the transparent state; else, if no direct current voltage signal is applied to the touch display unit, then the region corresponding to the touch display unit 151 is now in the transparent state, and in this case, a voltage signal then is applied to the touch display unit 151 in order to switch the region corresponding to the touch display unit 151 from the transparent state into the foggy state.

In additional embodiments of the present invention, the polarizer 14 can be disposed on a side of the second substrate 12 away from the first substrate 11.

In the present embodiment, a change of current flowing through each of the touch display units is detected by the detection circuit corresponding to the touch display unit to determine a touched region of the liquid crystal electronic curtain, so that different regions of the liquid crystal electronic curtain can be controlled to be in the transparent state or the foggy state separately.

Figure 2A:
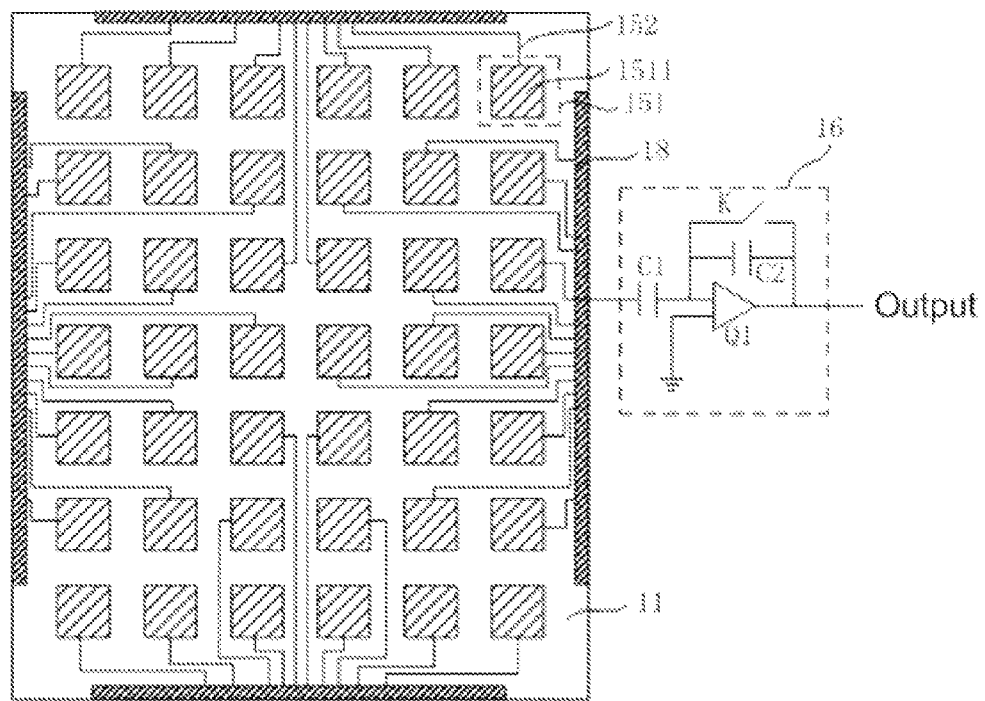
FIGS. 2A and 2B are top views of the first electrode layer of another liquid crystal electronic curtain provided by an embodiment of the present invention.
Figure 2B:
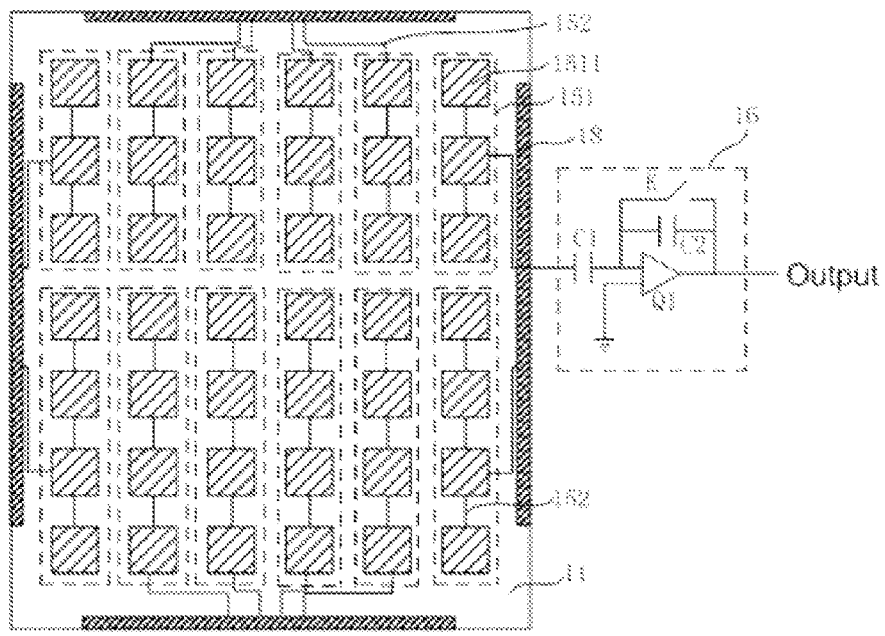

Referring to FIGS. 2A and 2B, FIGS. 2A and 2B are top views of another liquid crystal electronic curtain provided by an embodiment of the present invention. In the present embodiment, the liquid crystal electronic curtain includes: a first substrate 11, a second substrate 12 (as shown in FIG. 1A) disposed opposite to the first substrate 11, and a liquid crystal layer 13 (as shown in FIG. 1A) between the first substrate 11 and the second substrate 12; a polarizer 14 (as shown in FIG. 1A) disposed on a side of the first substrate 11 that is away from the second substrate; a first electrode layer disposed on a side of the first substrate 11 that faces the second substrate, the first electrode layer includes a plurality of touch display units 151 disposed separately from each other and a plurality of first electrode leads 152, each of the first electrode leads is connected with one of the touch display units, and the plurality of the touch display units 151 are respectively connected with a plurality of detection circuits 16 via the plurality of first electrode leads 152 leading out from an edge of the first substrate 11; a second electrode layer 17 (as shown in FIG. 1A) disposed on a side of the second substrate 12 that faces the first substrate 11; and a driving circuit 19 and a second electrode lead 172 (as shown in FIG. 1D), the driving circuit is connected with the second electrode lead.

In the present embodiment, a structure of the second electrode layer 17 is the same as that of the liquid crystal electronic curtain described above, and referring to FIG. 1D, the second electrode layer 17 includes a planar second electrode 171 and a second electrode lead 172, and the planar second electrode 171 is connected with the driving circuit 19 by the second electrode lead 172.

Still referring to FIGS. 2A and 2B, in the present embodiment, the touch display unit 151 may include at least one of block first electrodes 1511, the block first electrodes in each touch display unit 151 are connected with each other by the first electrode leads 152, and the plurality of touch display units 151 are arranged in an array.

Referring to FIG. 2A, it is noted in the present embodiment that the touch display unit 151 may include a single first electrode 1511, where a plurality of such first electrodes 1511 are arranged in an array, and each of the first electrodes 1511 is connected with the first electrode lead 152, which is in turn led out from an edge of the first substrate and further connected with the detection circuit 16. Referring to FIG. 2B, the touch display unit 151 may also include a plurality of block first electrodes 1511 (for example, three or four block first electrodes), where the plurality of block first electrodes 1511 are connected with each other by the first electrode lead 152 to form the touch display unit 151, the plurality of such touch display units 151 are arranged in an array, and the block first electrode may be of a regular shape or an irregular shape. In the case that the touch display unit 151 includes a plurality of first electrodes 1511, since gaps are present among the plurality of first electrodes 1511, an electric field formed between the touch display unit 151 and the second electrode 171 may become more disorder, thereby achieving a better foggy state.

In the present embodiment, a change of current flowing through each of the touch display units 151 is detected by the detection circuit 16 to determine a touched region of the liquid crystal electronic curtain, thereby controlling different regions of the liquid crystal electronic curtain in the transparent state or the foggy state separately. In the present embodiment, the touch display unit 151 of the first electrode layer may include the single block first electrode 1511 or the plurality of block first electrodes 1511 connected with each other by the first electrode lead 152, and the second electrode 171 of the second electrode layer 17 is planar, so that the liquid crystal electronic curtain can be touched more flexibly and effectively.

Referring to FIGS. 2C to 2F, FIG. 2C to 2F are schematic diagrams of the structure of a touch display unit in another liquid crystal electronic curtain provided by an embodiment of the present invention. The touch display units 151 include strip first electrodes 1511 extending along a first direction, and the plurality of the touch display units are arranged along a second direction perpendicular to the first direction.

In FIGS. 2C to 2F, the first direction is shown as a direction Y, and the second direction is shown as a direction X perpendicular to the direction Y. Alternatively, the first direction may be the direction X, and the second direction may be the direction Y. Each of the touch display units 151 extends along the first direction, and the plurality of touch display units are arranged along the second direction.

Figure 2C:
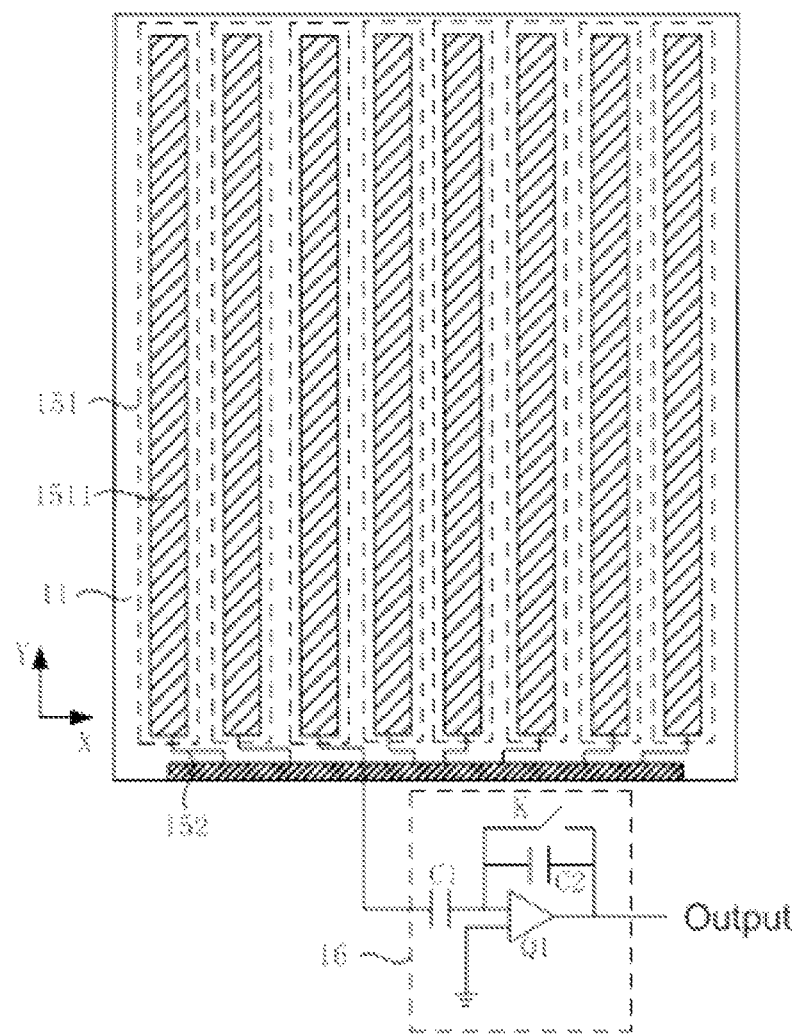
FIGS. 2C to 2G are schematic diagrams of the structure of a touch display unit in another liquid crystal electronic curtain provided by an embodiment of the present invention.
Figure 2D:
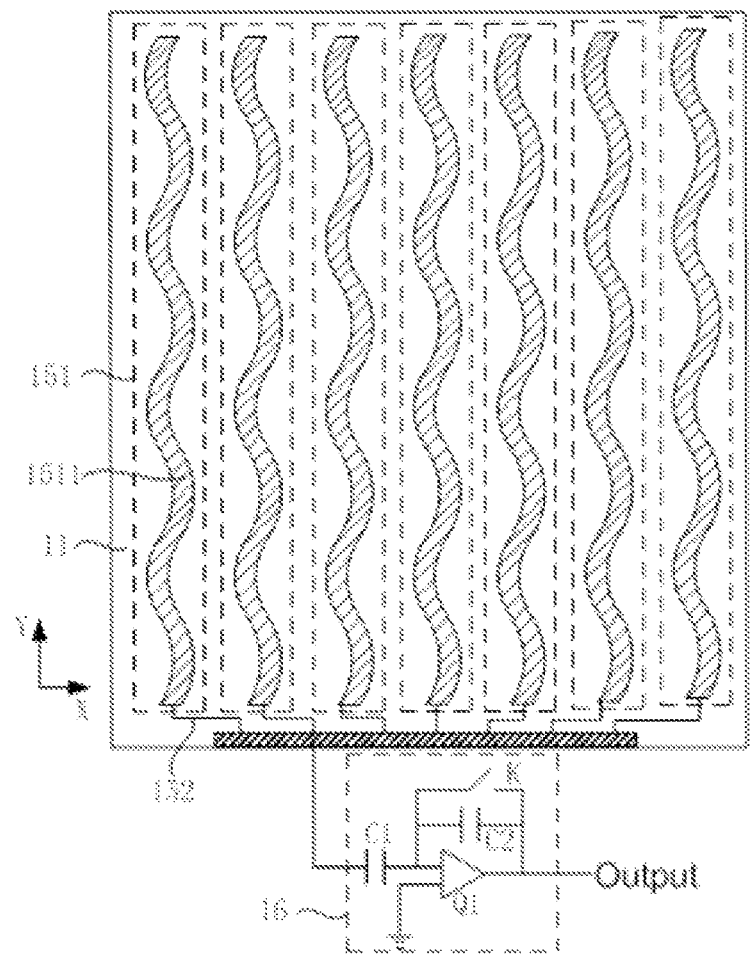
Figure 2E:
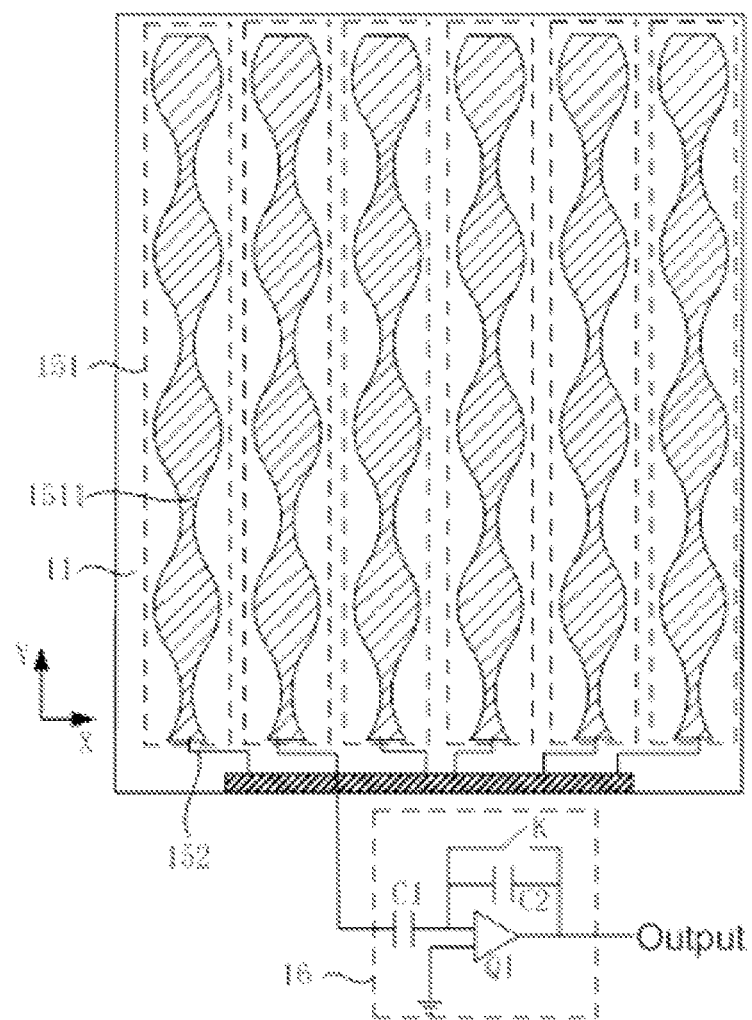
Figure 2F:
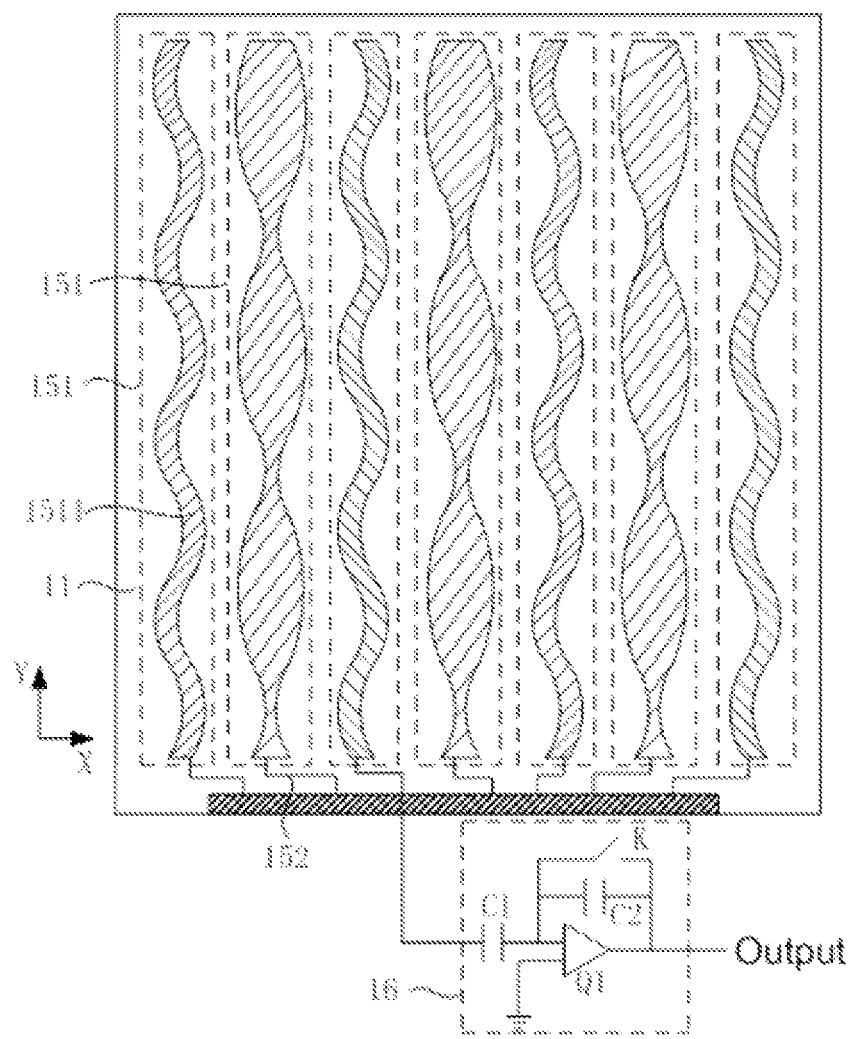
Figure 2G:
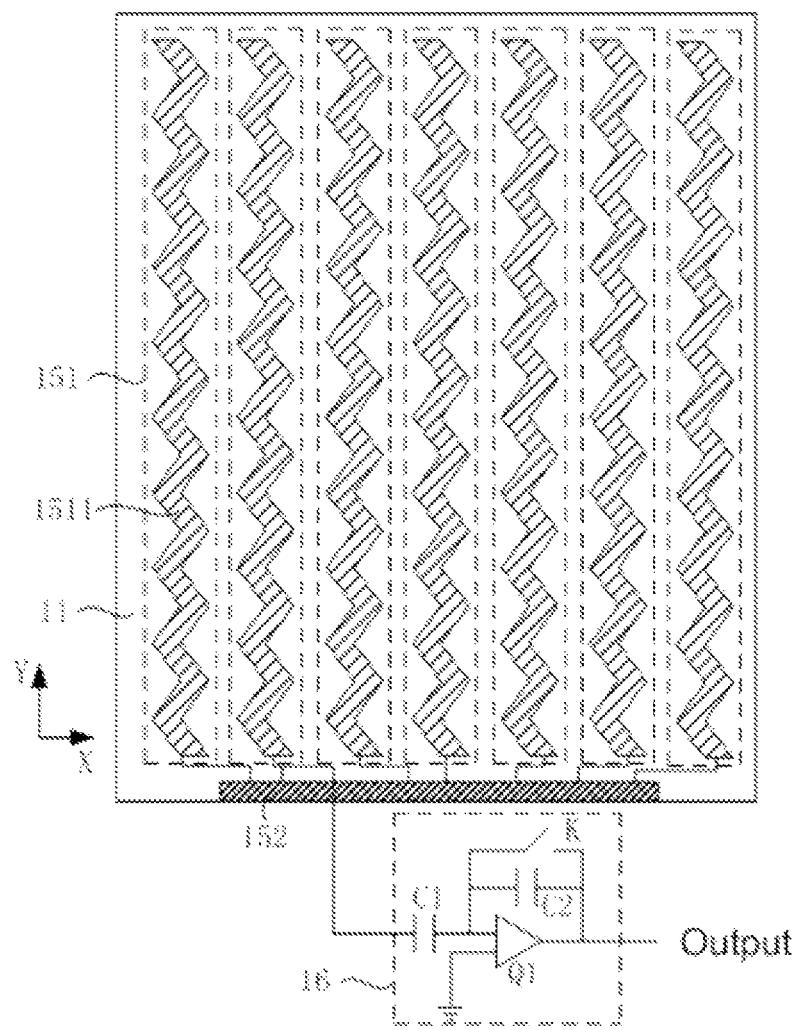

A shape of the strip first electrode extending along the first direction may be any of following structures. For example, the strip first electrode 1511 is of a linear type structure (as shown in FIG. 2C), or the strip first electrode 1511 has a non-linear edge, and two edges of the strip first electrode 1511 opposite to each other have the same variation (as shown in FIG. 2D) or different variations (as shown in FIG. 2E); or the strip first electrode 1511 has an arc edge and different strip first electrodes have arc edges with different curvatures (as shown in FIG. 2F); or the strip first electrode 1511 has a fold edge and two edges of the strip first electrode 1511 opposite to each other have the same variation (as shown in FIG. 2G).

It is noted that the shape of the strip first electrode may further be other shapes other than the shapes shown in FIGS. 2C to 2G.

In other embodiments of the present invention, the polarizer 14 may be disposed on a side of the second substrate 12 away from the first substrate 11.

In the present embodiment, a structure of the second electrode layer is the same as that of another liquid crystal electronic curtain described above, and hence can refer to structures shown in FIG. 1D and described in other embodiments, which is not repeatedly discussed again.

In the present embodiment, a change of current flowing through each of the touch display units 151 is detected by the detection circuit 16 to determine a touched region of the liquid crystal electronic curtain, thereby controlling different regions of the liquid crystal electronic curtain to be in the transparent state or the foggy state, separately. Moreover, in the present embodiment the second electrode has a planar shape and the touch display unit of the first electrode layer is designed as a strip first electrode extending along the first direction, so that a user can touch-sensing the liquid crystal electronic curtain, and such touch-sensing is based on the different touched regions of the liquid crystal electronic curtain according to requirements, so as to provide a user with convenience in use and improve user experience since the user can switch between the transparent state and the foggy state freely in the different touched regions, separately.

Figure 2H:
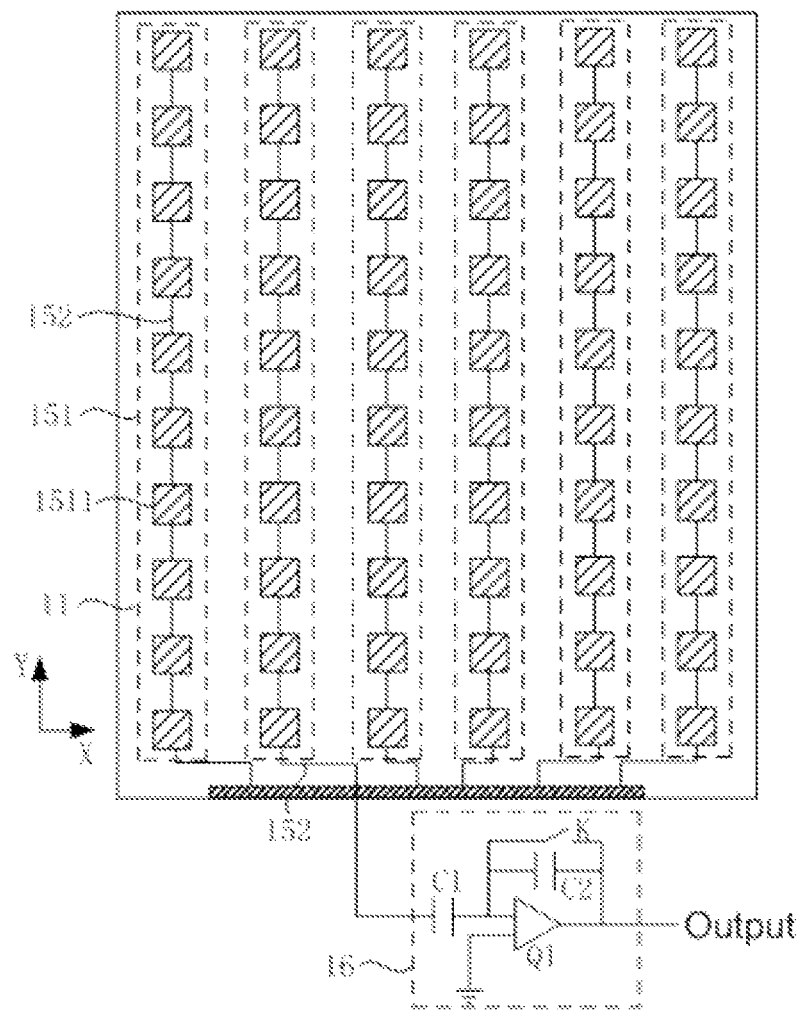
FIGS. 2H to 2I are schematic diagrams of another structure of a touch display unit in another liquid crystal electronic curtain provided by an embodiment of the present invention.
Figure 2I:
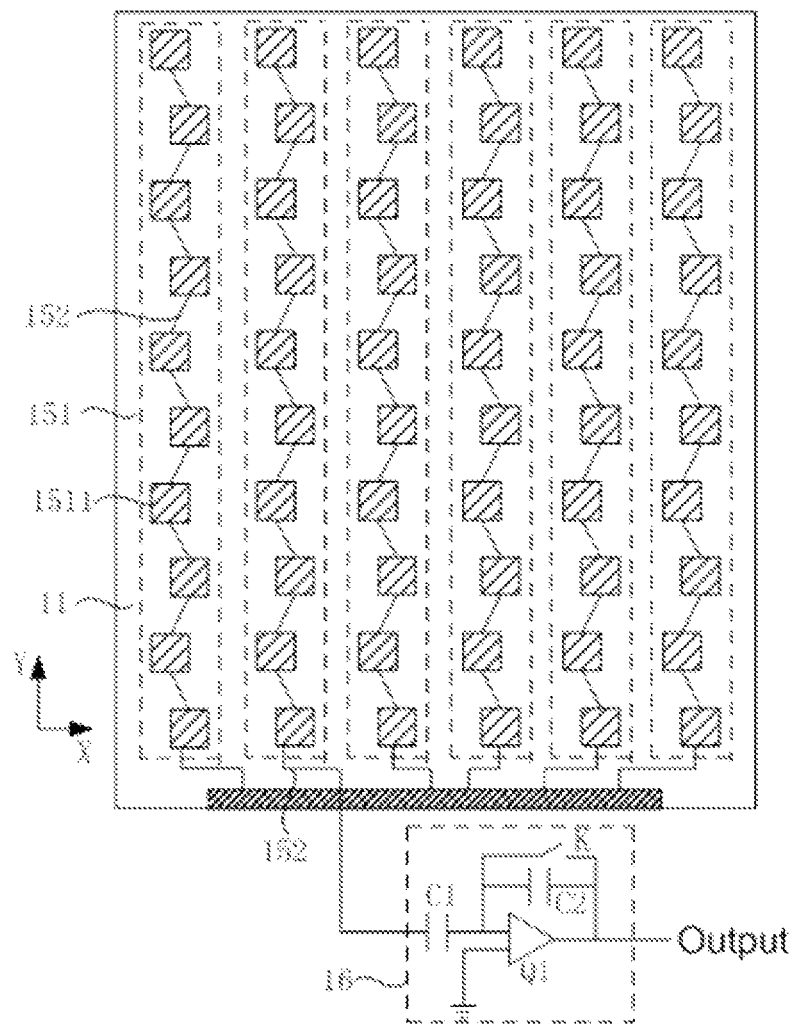

Referring to FIGS. 2H to 2I, FIGS. 2H to 2I are schematic diagrams of another structure of a touch display unit in another liquid crystal electronic curtain provided by an embodiment of the present invention. The touch display units 151 include a plurality of block first electrodes 1511 arranged along a first direction, the plurality of the block first electrodes 1511 are connected with each other by the first electrode lead 152, and the plurality of the touch display units are arranged along a second direction perpendicular to the first direction.

Referring to FIG. 2H to 2I, a configuration in which the plurality of block first electrodes 1511 are connected together with each other by the first electrode lead 152 may be any of following structures. For example, such configuration may be a linear type structure (as shown in FIG. 2H), or may be a fold type structure which generally extends along the first direction (as shown in FIG. 2I).

In the liquid crystal electron curtain shown in FIGS. 2H to 2I, a plurality of block first electrodes 1511 arranged along the first direction in each column of touch display unit are connected with one of the detection circuits by the first electrode lead.

In the present embodiment, a change of current flowing through each of the touch display units 151 is detected by one of the detection circuits 16 to determine a touched region of the liquid crystal electronic curtain, thereby separately controlling different regions of the liquid crystal electronic curtain to be in the transparent state or the foggy state. Moreover, in the present embodiment, the second electrode has a planar shape and the touch display unit of the first electrode layer is provided by strip first electrodes extending along the first direction and being connected with each other by the first electrode lead, so that a user can touch-sensing the liquid crystal electronic curtain, and such touch-sensing is based on the different touched regions of the liquid crystal electronic curtain according to requirements, so as to provide a user with convenience in use and improve user experience since the user can switch between the transparent state and the foggy state freely in the different touched regions.

Figure 3A:
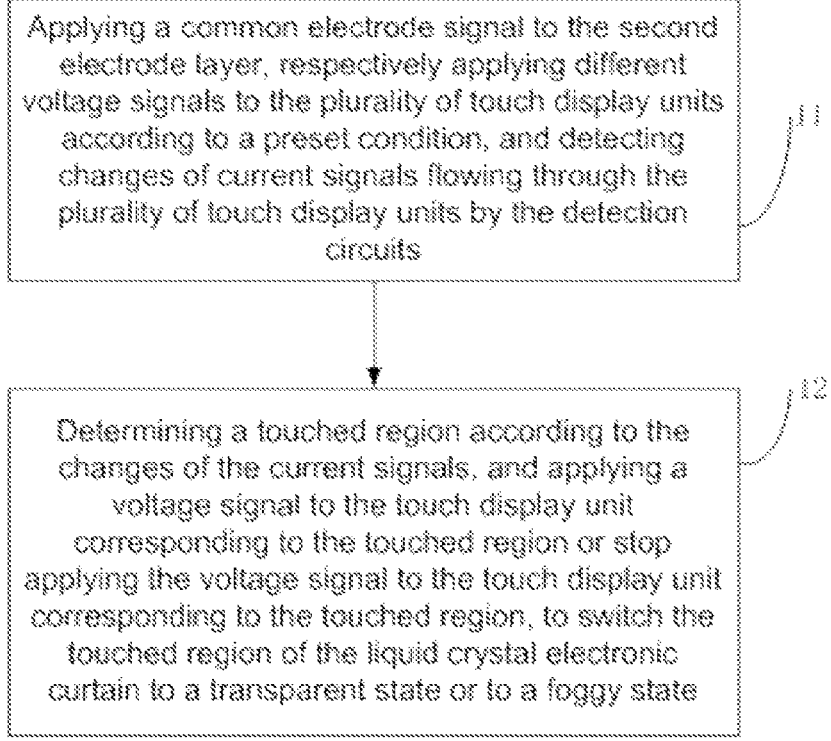
FIGS. 3A and 3B are flowcharts of a driving method of a liquid crystal electronic curtain provided by the embodiment of the present invention.
Figure 3B:
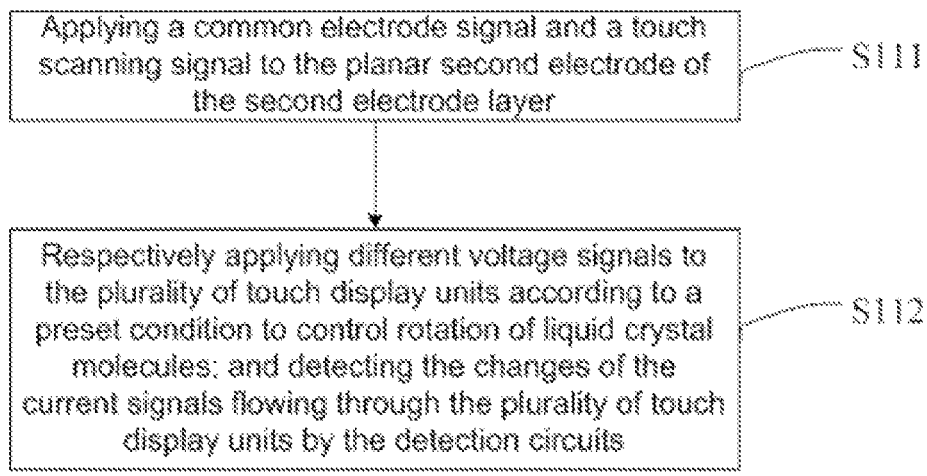

An embodiment of the present invention further provides a driving method of a liquid crystal electronic curtain. Referring to FIGS. 3A and 3B, FIGS. 3A and 3B are flowcharts of a driving method of a liquid crystal electronic curtain provided by the embodiment of the present invention, and the driving method of the liquid crystal electronic curtain includes Steps S11 to S12 below.

At Step S11, applying a common electrode signal to the second electrode layer, respectively applying different voltage signals to the plurality of touch display units according to a preset condition, and detecting changes of current signals flowing through the plurality of touch display units by the detection circuits.

Specifically, if a common electrode signal and a voltage signal are applied to the second electrode layer and the touch display unit, respectively, an electric field is formed between the second electrode layer and the touch display unit to cause rotation of liquid crystal molecules in the liquid crystal layer.

At Step S12, determining a touched region according to the change of the current signal, and applying a voltage signal to the touch display unit corresponding to the touched region or stop applying the voltage signal to the touch display unit corresponding to the touched region, to switch the touched region of the liquid crystal electronic curtain into a transparent state or into a foggy state.

Specifically, as shown in FIG. 3B, if the second electrode layer includes a planar second electrode and a second electrode lead, and the planar second electrode is connected with the driving circuit by the second electrode lead, the Step S11 of the driving method further includes Steps S111 to S112 below.

At Step S111, applying a common electrode signal and a touch scanning signal to the planar second electrode of the second electrode layer;

At Step S112, respectively applying different voltage signals to the plurality of touch display units according to a preset condition to control rotation of liquid crystal molecules; and detecting changes of the current signals flowing through the plurality of touch display units by the detection circuits.

In another liquid crystal electronic curtain provided by the embodiment of the present invention, a planar second electrode is provided on the second substrate and functions as a touch driving electrode; a common electrode signal and a touch scanning signal are applied to the planar second electrode, the common electrode signal and the touch scanning signal both are alternate current voltage signals, and an alternate current frequency of the common electrode signal is smaller than an alternate current frequency of the touch scanning signal, where, the common electrode signal having smaller frequency is configured to control rotation of the liquid crystal molecules of the liquid crystal layer, the touch scanning signal having larger frequency functions as a touch driving voltage. Since the planar second electrode of the second electrode layer and the first electrode of the touch display unit in the first electrode layer can form a capacitor, a sensing signal can be generated on the first electrode of each of the touch display units in the first electrode layer; also, since each of the touch display units is connected with the first electrode lead which is in turn led out from the edge of the first substrate and further connected with the detection circuit, when a finger touches the touch display unit, a tiny current is flowed away from the touched touch display unit. Therefore, it can be determined which of the touch display units is touched, based on the detected change of a current flowing through each of the touch display units. After that, a direct current voltage signal is applied to a first electrode of the touch display unit corresponding to the touched region, or the direct current voltage signal is stopped applying to the first electrode, so as to switch the touched region of the liquid crystal electronic curtain to a transparent state or to a foggy state. In the present embodiment, since a frequency of the common electrode signal configured to control rotation of the liquid crystal molecules in the liquid crystal layer is smaller than a frequency of the touch scanning signal configured for touching, touch and display does not need to be operated in a time division manner, thereby shortening time of displaying a frame of picture.

If the detection circuits detect that a preset number of the current signals flowing through the first electrodes are changed, the whole liquid crystal electronic curtain can be switched to the transparent state or the foggy state. For example, the number of the detection circuits of the liquid crystal electronic curtain is equal to 200, when more than five detection circuits detect that the current signals flowing through the first electrodes corresponding to detection circuits are changed, the whole liquid crystal electronic curtain is switched to the transparent state or the foggy state.

In the present embodiment, an alternate current voltage signal is applied to the planar second electrode, different voltage signals are applied to the first electrodes of the plurality of touch display units according to a preset condition to control rotation of liquid crystal molecules, and the change of the current signal flowing through the first electrode is detected by the detection circuit, so that the touched region can be determined according to the change of the current signal, and hence a direct current voltage signal is applied to the first electrode of the touch display unit or the direct current voltage signal is stopped applying to the first electrode, so as to switch the touched region of the liquid crystal electronic curtain to a transparent state or to a foggy state. In such above configuration, no additional component is added, and the electrodes of the liquid crystal electronic curtain are utilized to control the liquid crystal electronic curtain to be opened and closed, and can control different regions of the liquid crystal electronic curtain to be in the transparent state or the foggy state, thereby providing a user with convenience in use and improving user experience.

Figure 4A:
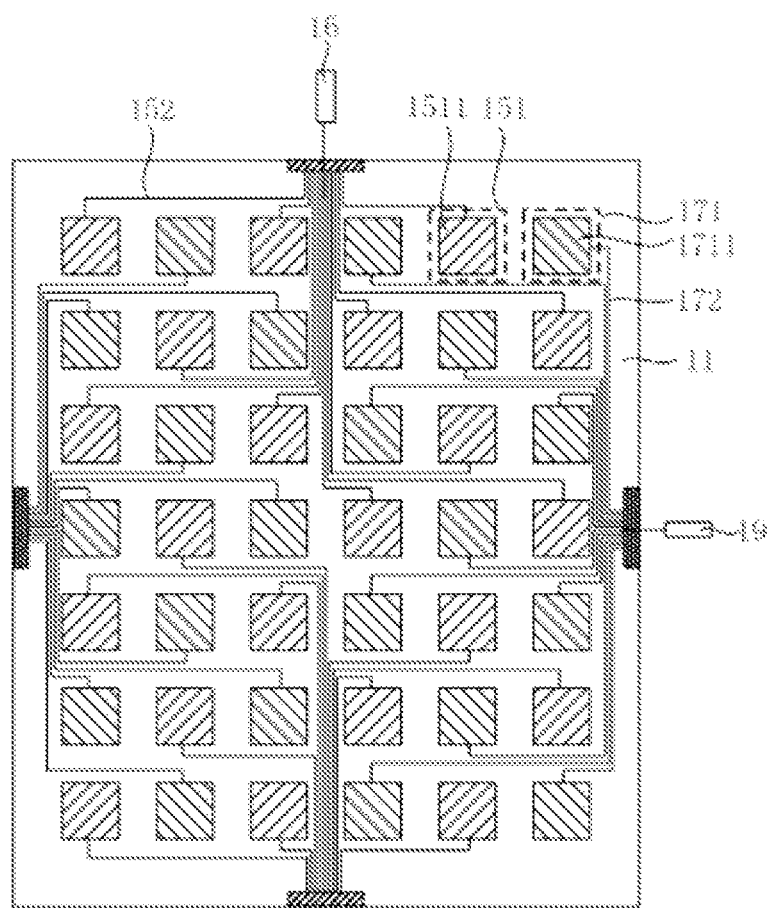
FIG. 4A is a top view of the first electrode layer of another liquid crystal electronic curtain provided by an embodiment of the present invention.

Referring to FIG. 4A, FIG. 4A is a top view of the first electrode layer of another liquid crystal electronic curtain provided by an embodiment of the present invention. FIG. 4A schematically illustrates a first electrode layer disposed on a side of the first substrate 11 that faces the second substrate 12 (as shown in FIG. 1A), and the first electrode layer includes a plurality of touch display units 151 disposed separately from each other and a plurality of first electrode leads 152, where, the touch display unit 151 includes a block first electrode, and in additional some embodiments of the present invention, the touch display unit 151 can also include a plurality of block first electrodes connected with each other, the first electrode layer further includes a plurality of drive display units 171 disposed separately from each other and a plurality of second electrode leads 172, where, the plurality of drive display units 171 are respectively connected with a plurality of the driving circuits 19 via the plurality of second electrode leads 172 leading out from the edge of the first substrate 11. Specifically, the drive display unit 171 includes a block second electrode 1711. In other embodiments, the drive display unit may further include a plurality of block second electrodes connected with each other, where, the drive display units are electrically insulated from the touch display unit 152. In the present embodiment, the block first electrode 1511 and the block second electrode 1711 both are rectangle electrodes. In other embodiments, the block first electrode 1511 and the block second electrode 1711 may further be rhombus or other regular or irregular shape.

Figure 4B:
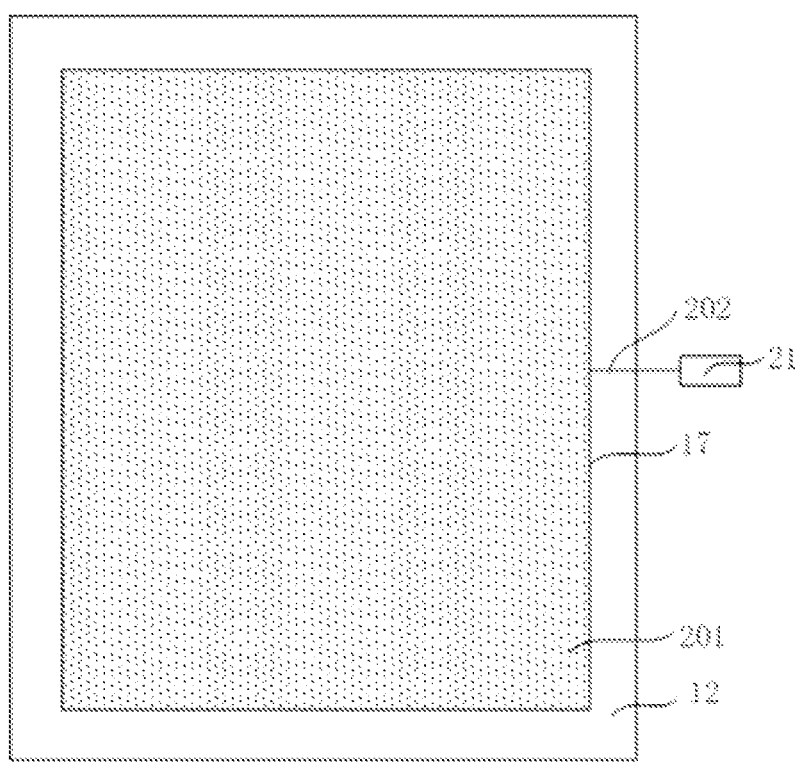
FIG. 4B is a top view of the second electrode layer of another liquid crystal electronic curtain provided by an embodiment of the present invention.

Referring to FIG. 4B, FIG. 4B is a top view of the second electrode layer of another liquid crystal electronic curtain provided by an embodiment of the present invention. the second electrode layer 17 is provided on a side of the second substrate 12 that faces the first substrate 11 (as shown in FIG. 1A), where, the second electrode layer 17 includes a planar common electrode 201 and a common electrode lead 202, and the common electrode 201 is connected with a common electrode driving circuit 21 by the common electrode lead 202 to apply a common voltage to the common electrode 201.

In the present embodiment, a change of a current flowing through each of the touch display units is detected by the detection circuit to determine a touched region of the liquid crystal electronic curtain, thereby controlling different regions of the liquid crystal electronic curtain to be in the transparent state or the foggy state separately. In the present embodiment, the touch display unit 151 and the drive display unit 171 in the first electrode layer can include a single block first electrode 1511 and a block second electrode 1711, thereby being capable of touching the liquid crystal electronic curtain more flexibly and effectively.

Figure 5:
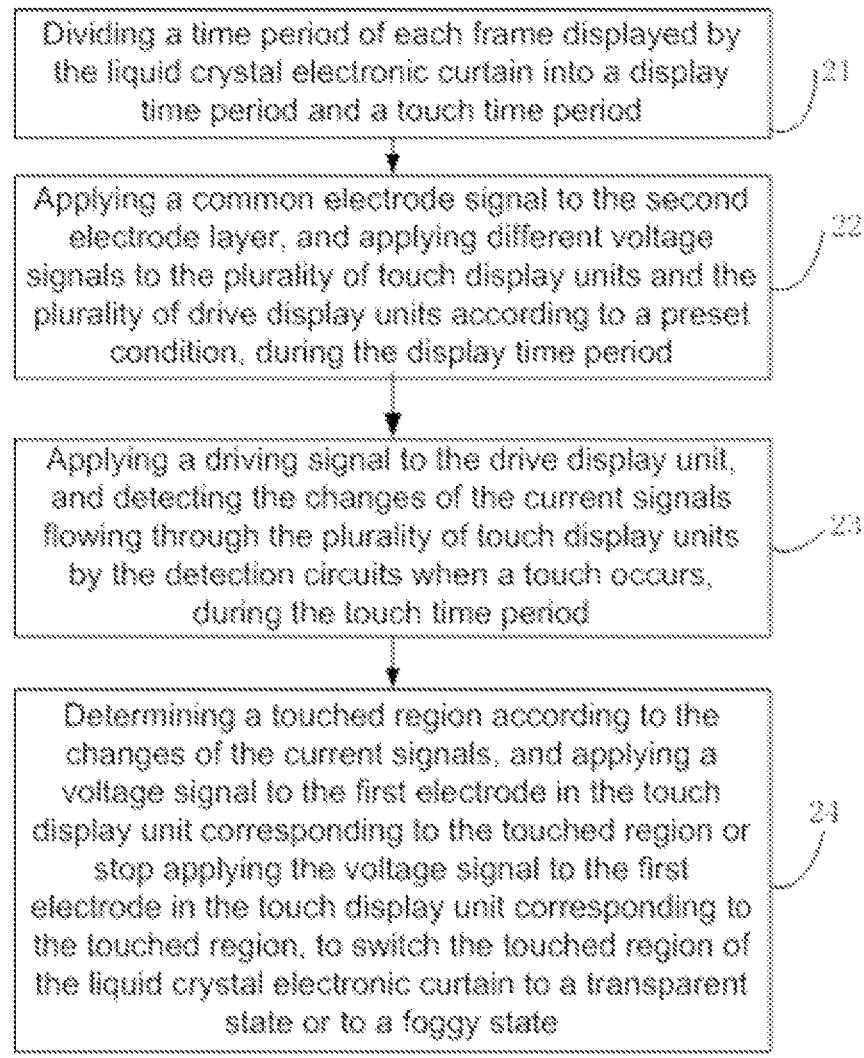
FIG. 5 is a flowchart of another driving method of a liquid crystal electronic curtain provided by the embodiment of the present invention.

An embodiment of the present invention further provides another driving method of the liquid crystal electronic curtain. Referring to FIG. 5, FIG. 5 is a flowchart of another driving method of a liquid crystal electronic curtain provided by the embodiment of the present invention, and the driving method of the liquid crystal electronic curtain includes Steps S21 to S24 below.

At Step S21, dividing a time period of each frame displayed by the liquid crystal electronic curtain into a display time period and a touch time period.

For example, a time period of each frame displayed by the liquid crystal electronic curtain is 16.67 ms, where a time period of 4 ms is selected from the 16.67 ms to function as the touch time period, and other remaining time period i.e. 12.67 ms functions as the display time period. The time periods of the touch time period and the display time period may also be adjusted appropriately according to process capacity of the IC chip, which is not limited thereto.

At Step S22, applying a common electrode signal to the second electrode layer, and applying different voltage signals to the plurality of touch display units and the plurality of drive display units according to a preset condition, during the display time period.

At Step S23, applying a driving signal to the drive display unit, and detecting the change of the current signal flowing through the plurality of touch display units by the detection circuit when a touch occurs, during the touch time period.

At Step S24, determining a touched region according to the change of the current signal, and applying a voltage signal to the touch display unit corresponding to the touched region or stop applying the voltage signal to the touch display unit corresponding to the touched region, to switch the touched region of the liquid crystal electronic curtain to a transparent state or to a foggy state.

In another liquid crystal electronic curtain provided by an embodiment of the present invention, a planar common electrode is disposed on the second substrate, and during the display time period, a common electrode signal (i.e., an alternate current voltage signal) is applied to the planar common electrode of the second electrode layer, and different voltage signals are applied to the plurality of touch display units and the plurality of drive display units according to a preset condition in order to control rotation of liquid crystal molecules; during the touch time period, the first electrode of the touch display unit is multiplexed as the touch sensing electrode, and the driving circuit surrounding the liquid crystal electronic curtain applies a driving signal (i.e., an alternate current voltage signal) to the second electrode of the drive display electrode. Since the second electrode of the drive display unit and the first electrode of the touch display unit can form a capacitor, a sensing signal can be generated on the first electrode of each of the touch display units in the first electrode layer; also, since each of the touch display units is connected with the first electrode lead which is in turn led out from the edge of the first substrate and further connected with the detection circuit, when a finger touches the touch display unit, a tiny current is flowed away from the touched touch display unit, and thus it can be determined which of the touch display units is touched, based on the detected change of a current flowing through each of the touch display units.

If the detection circuits detect that a preset number of the current signals flowing through the first electrodes are changed, the whole liquid crystal electronic curtain can be switched to the transparent state or the foggy state.

In the present embodiment, a common electrode signal is applied to the planar common electrode, different voltage signals are applied to the first electrodes of the plurality of touch display units according to a preset condition to control rotation of liquid crystal molecules, and the change of the current signal flowing through the first electrode is detected by the detection circuit, so that the touched region can be determined according to the change of the current signal, and hence a direct current voltage signal is applied to the first electrode of the touch display unit or the direct current voltage signal is stopped applying to the first electrode, so as to switch the touched region of the liquid crystal electronic curtain to a transparent state or to a foggy state. In such above configuration, no additional component is added, and the electrodes of the liquid crystal electronic curtain are utilized to control the liquid crystal electronic curtain to be opened and closed, and can control different regions of the liquid crystal electronic curtain to be in the transparent state or the foggy state, thereby providing a user with convenience in use and improving user experience.

Referring to FIGS. 6A to 6G, FIGS. 6A to 6G are top views of the second electrode layer of a liquid crystal electronic curtain provided by an embodiment of the present invention. In the present embodiment, the liquid crystal electronic curtain includes: a first substrate 11 (as shown in FIG. 1A), a second substrate 12 disposed opposite to the first substrate 11, and a liquid crystal layer 13 (as shown in FIG. 1A) between the first substrate 11 and the second substrate 12; a polarizer 14 (as shown in FIG. 1A) disposed on a side of the first substrate 11 that faces the second substrate 12; a first electrode layer disposed on a side of the first substrate 11 that faces the second substrate, the first electrode layer includes a plurality of touch display units disposed separately from each other and a plurality of first electrode leads, each of the first electrode leads is connected with one of the touch display units, and the plurality of the touch display units are respectively connected with a plurality of detection circuits 16 (as shown in FIG. 1C) via the plurality of first electrode leads which lead out from an edge of the first substrate; a second electrode layer 17 (as shown in FIG. 1) disposed on a side of the second substrate 12 that faces the first substrate 11; and a driving circuit 19 and a second electrode lead 172 connected with driving circuit 19. In the present embodiment, the second electrode layer includes a plurality of drive display units 171 disposed separately from each other and a plurality of second electrode leads 172, each of the second electrode leads 172 is connected with one of the drive display units 171, and each of the second electrode leads 172 may be connected with the driving circuit 19 by the Flexible Printed Circuit Board (FPCB) or may also be directly connected with the driving circuit 19 on the second substrate 12.

Specifically, in the present embodiment, a structure of the first substrate 11 may be same as that of the liquid crystal electronic curtain described above, and referring to FIGS. 2C to 2I, the touch display unit 151 includes strip first electrode 1511 extending along a first direction, or the touch display unit 151 includes a plurality of block first electrodes 1511 arranged along the first direction and connected with each other by the first electrode lead 152, and the plurality of the touch display units 151 are arranged along a second direction perpendicular to the first direction.

Referring to FIG. 6A to FIG. 6G, the drive display unit 171 includes strip second electrode 1711 extending along a second direction, or the drive display unit 171 includes a plurality of block second electrodes 1711 arranged along the second direction and connected with each other by the second electrode lead 172, and the plurality of the drive display units are arranged along a first direction perpendicular to the second direction.

It is noted in the present embodiment if the touch display unit 151 includes strip first electrode 1511 extending along a first direction, the touch display unit 171 may include a strip second electrode 1711 extending along a second direction, or alternatively may include a plurality of block second electrodes 1711 arranged along the second direction and connected with each other by the second electrode lead 172, and the plurality of such drive display units 171 are arranged along a first direction perpendicular to the second direction; also, if the touch display unit 151 includes a plurality of block first electrodes 1511 arranged along the first direction, the plurality of block first electrodes 1511 are connected with each other by the first electrode lead 152, and if the plurality of the touch display units 151 are arranged along a second direction, the drive display unit 171 may include a strip second electrode 1711 extending along the second direction, or alternatively may include the plurality of block second electrodes 1711 arranged along the second direction and connected with each other by the second electrode leads 172, and the plurality of such drive display units 171 are arranged along a first direction perpendicular to the second direction. The present disclosure does not limit the arrangement of combining the first electrode of the touch display unit with the second electrode of the drive display unit, as long as the direction for arrangement of the touch display unit is perpendicular to the direction for arrangement of the driving display unit.

In the present embodiment, the second electrode may be a common electrode, and the first electrode may be a pixel electrode, the shape of the strip first electrode 151 is the same as that of another liquid crystal electronic curtain provided by an embodiment of the present invention (FIGS. 2C to 2G), and the shape of the plurality of block first electrodes 1511 connected with each other by the first electrode lead 152 is the same as that of another liquid crystal electronic curtain provided by an embodiment of the present invention (FIGS. 2H to 2I), which is not repeatedly discussed again.

Figure 6A:
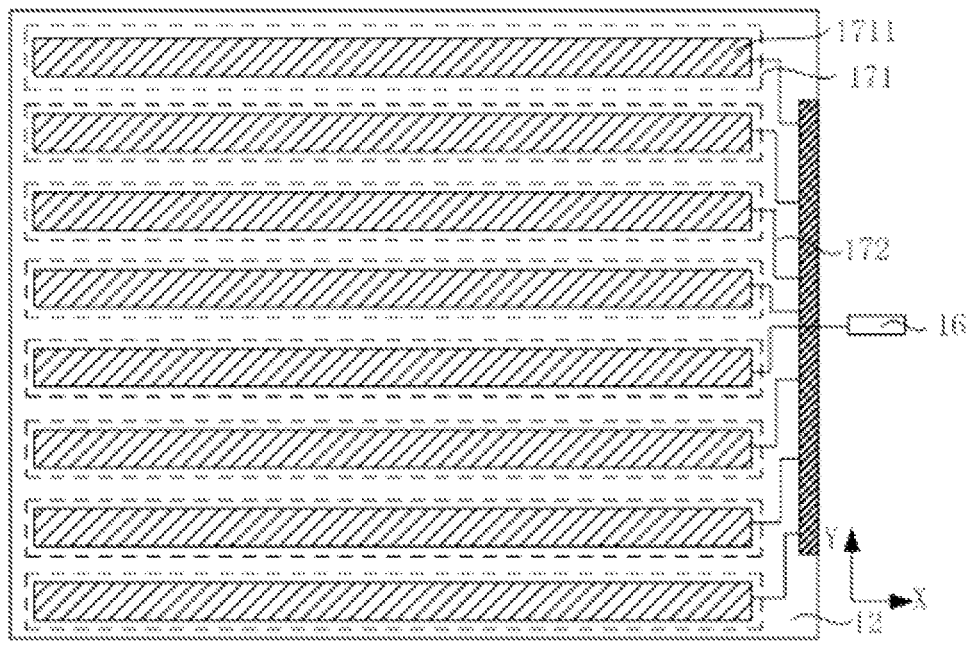
FIGS. 6A to 6G are top views of the second electrode layer of another liquid crystal electronic curtain provided by an embodiment of the present invention.
Figure 6B:
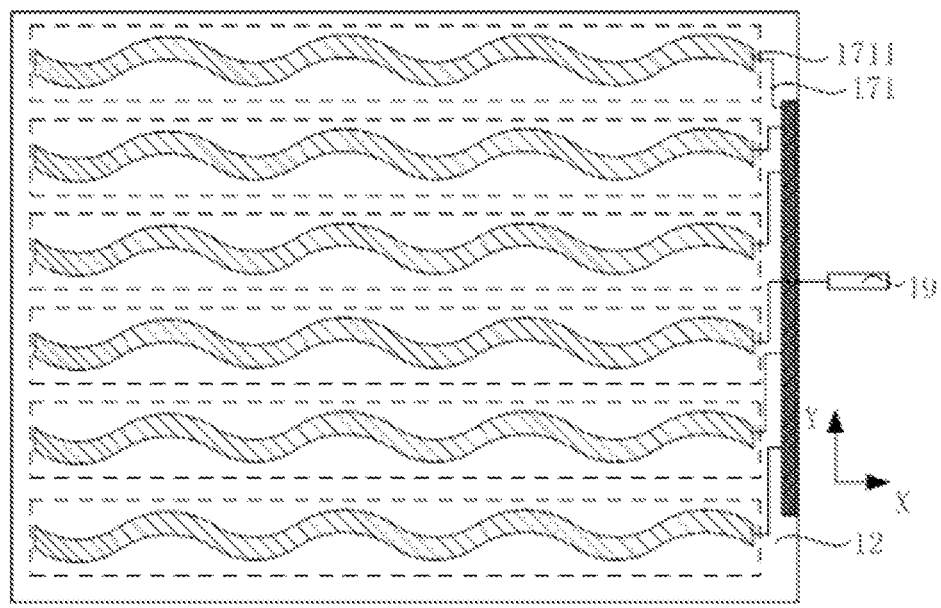
Figure 6C:
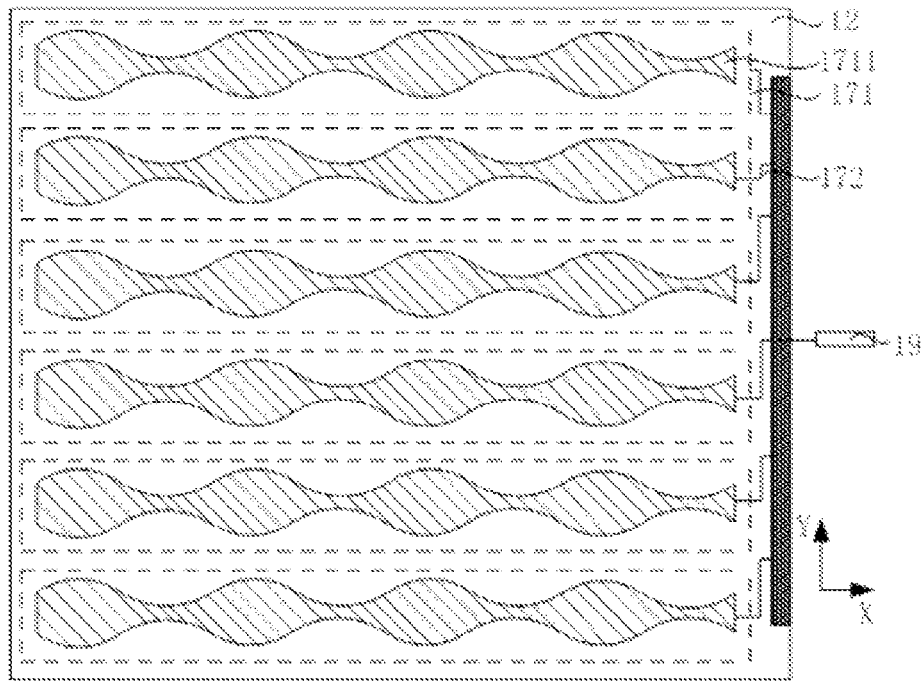
Figure 6D:
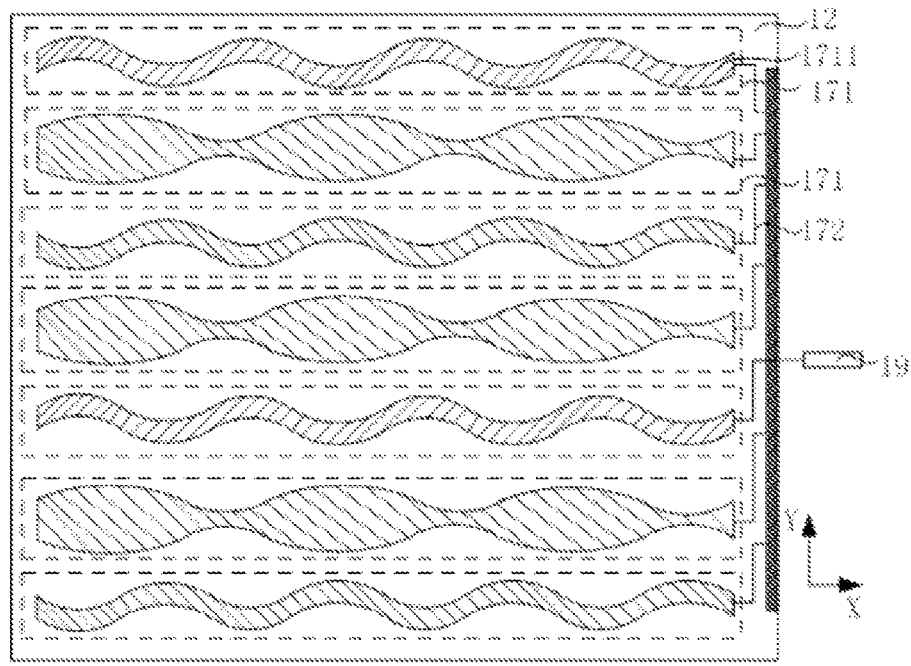
Figure 6E:
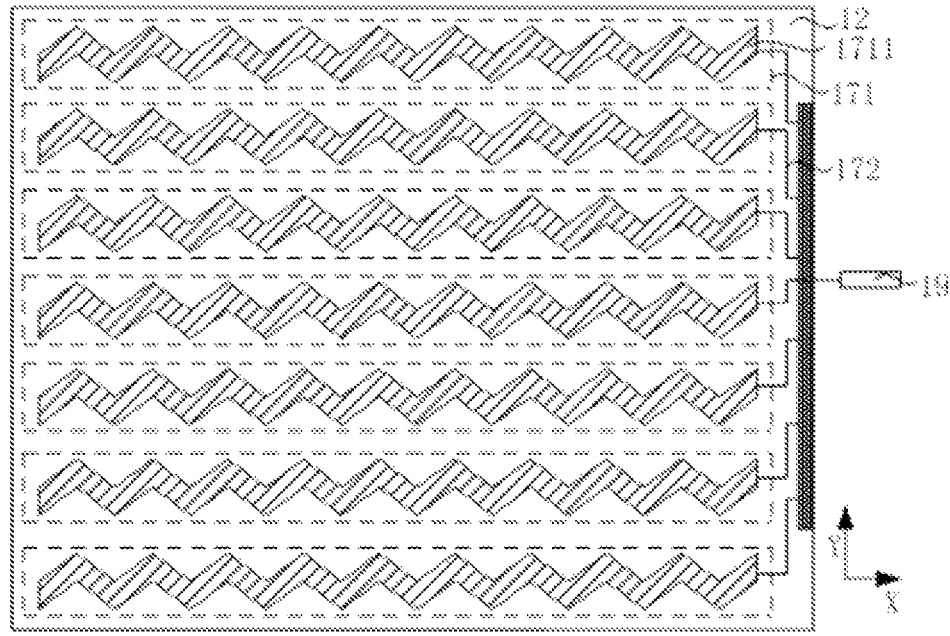

Referring to FIG. 6A to FIG. 6E, the shape of the strip second electrode arranged along the second direction may be any of following structures. For example, the strip second electrode 1711 is of a linear type structure (as shown in FIG. 6A), or the strip second electrode 1711 has a non-linear edge, and two edges of the strip second electrode 1711 opposite to each other have the same variation (as shown in FIG. 6B) or different variations (as shown in FIG. 6C), or the strip second electrode 1711 has an arc edge and different strip second electrodes have arc edges with different curvatures (as shown in FIG. 6D), or the strip second electrode 1711 has a fold edge and two edges of the strip second electrode 1711 opposite to each other have the same variation (as shown in FIG. 6E).

Figure 6F:
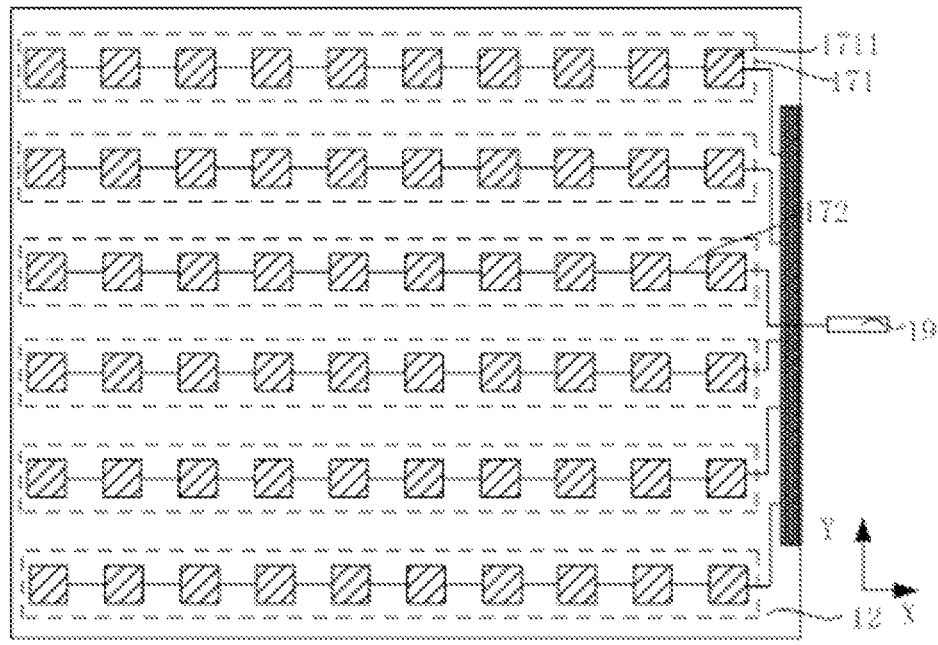
Figure 6G:
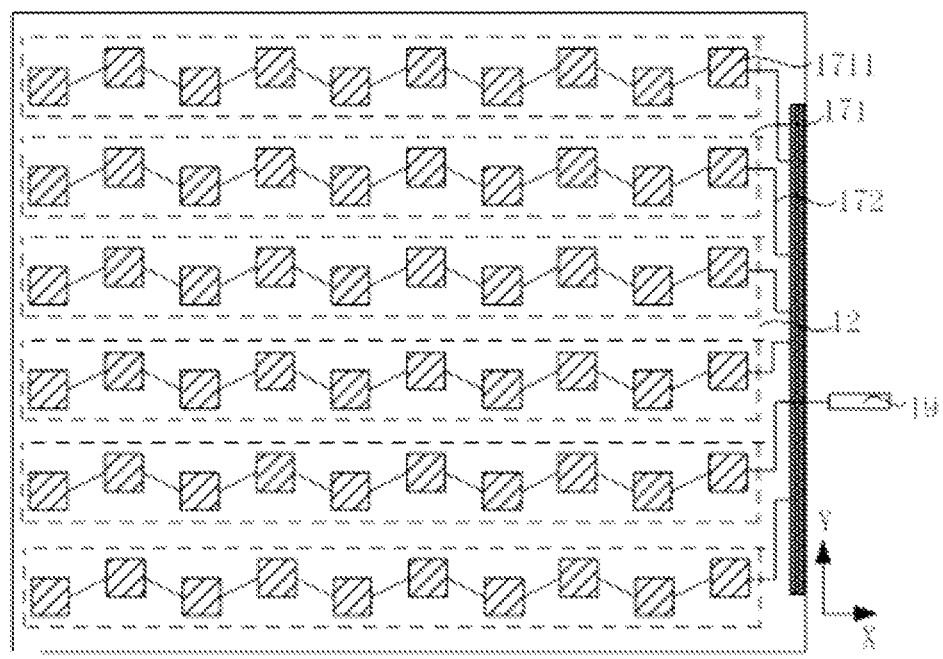

Referring to FIG. 6F to FIG. 6G, a configuration in which the plurality of block second electrodes 1711 are connected together with each other by the second electrode lead 172 may be any of following structures. For example, such configuration may be a linear type structure (as shown in FIG. 6F), or may be a fold type structure which generally extends along the second direction (as shown in FIG. 6G).

Figure 7:
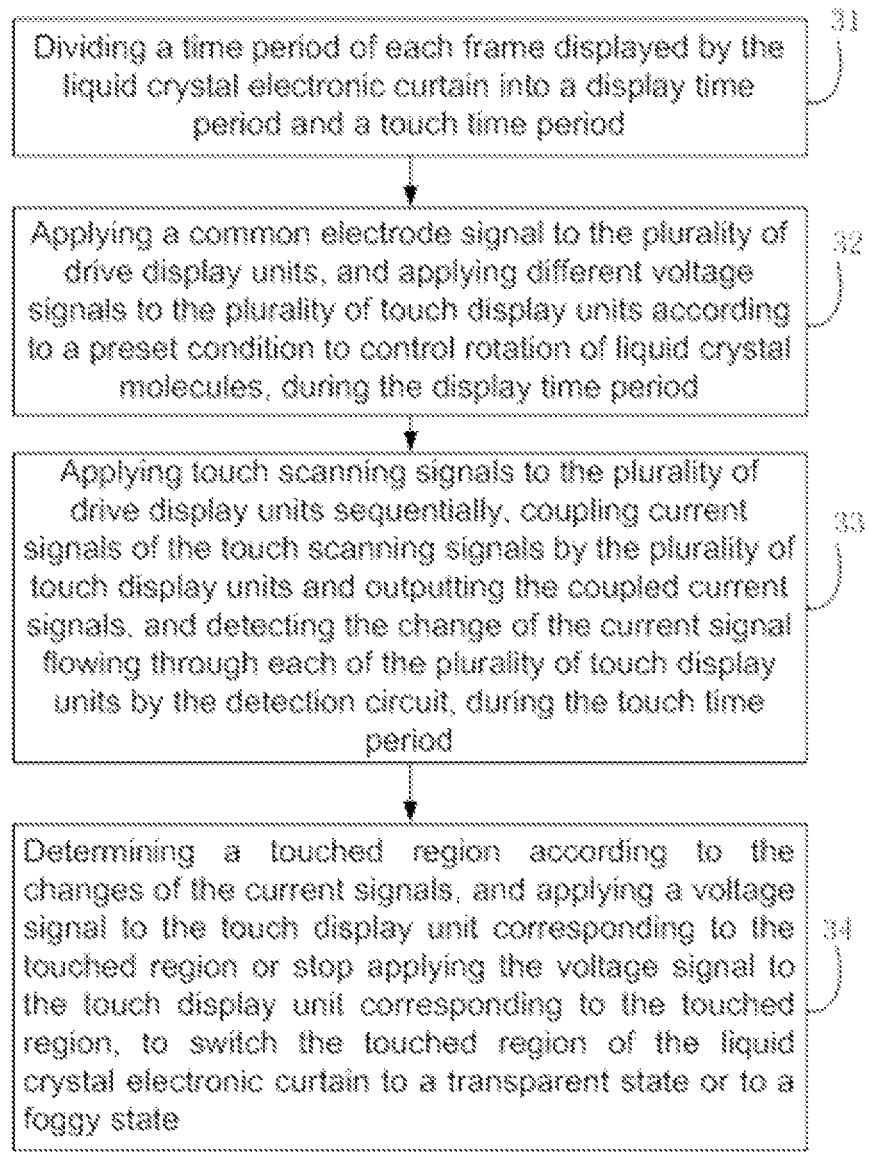
FIG. 7 is a flowchart of another driving method of a liquid crystal electronic curtain provided by the embodiment of the present invention.

An embodiment of the present invention further provides another driving method of a liquid crystal electronic curtain. Referring to FIG. 7, FIG. 7 is a flowchart of another driving method of a liquid crystal electronic curtain provided by the embodiment of the present invention, the liquid crystal electronic curtain is another liquid crystal electronic curtain provided by an embodiment of the present invention (the liquid crystal electronic curtain shown in FIGS. 6A to 6G), and the driving method of the liquid crystal electronic curtain includes Steps S31 to S34 below.

At Step S31, dividing a time period of each frame displayed by the liquid crystal electronic curtain into a display time period and a touch time period.

At Step S32, applying a common electrode signal to the plurality of drive display units, and applying different voltage signals to the plurality of touch display units according to a preset condition to control rotation of liquid crystal molecules, during the display time period. The common electrode signal is an alternate current voltage signal. During the display time period, the common electrode signal is simultaneously applied to the second electrodes of the plurality of drive display units, and a voltage signal is applied to the first electrode or the voltage signal is stopped applying to the first electrode according a preset condition; when the voltage signal is applied to the first electrode, the liquid crystal electronic curtain is in the foggy state in a position corresponding to the first electrode; when no voltage signal is applied to the first electrode, the liquid crystal electronic curtain is in the transparent state in a position corresponding to the first electrode. Therefore the voltage signal may be applied to the first electrode of the touch display unit or the voltage signal is stopped applying to the first electrode, according to requirements.

At Step S33, applying a touch scanning signal to the plurality of drive display units sequentially, coupling current signals of the touch scanning signals by the plurality of touch display units and outputting the coupled current signals, and detecting the change of the current signal flowing through each of the plurality of touch display units by the detection circuit, during the touch time period.

At Step S34, determining a touched region according to the change of the current signal, and applying a voltage signal to the touch display unit corresponding to the touched region or stop applying the voltage signal to the touch display unit corresponding to the touched region, to switch the touched region of the liquid crystal electronic curtain into a transparent state or into a foggy state.

From above, the drive display unit includes a strip second electrode or includes a plurality of block second electrodes arranged along a second direction and connected with each other by the second electrode lead, and the plurality of drive display units are arranged along a first direction, so that a position of the second electrode in the first direction can be determined when a touch scanning signal is applied to the second electrodes of the plurality of drive display units sequentially. The first electrodes of the plurality of touch display units couple current signals of the touch scanning signals and output the coupled current signals; a position of the touched first electrode in the second direction can be determined according to changes of the current signals flowing through the first electrodes of the touch display units in the detection circuits, and the touched region can be determined according to the position of the second electrode in the first direction and the position of the first electrode in the second direction. Based on this, a voltage signal is applied to the touch display unit corresponding to the touched region or the voltage signal is stopped applying to the touch display unit corresponding to the touched region, so as to switch the touched region of the liquid crystal electronic curtain to a transparent state or to a foggy state. In the present embodiment, since the manner of applying a voltage signal to the second electrode during the display time period is different from the manner of applying a voltage signal to the second electrode during the touch time period (i.e. the common electrode signal simultaneously applied to the second electrodes in the plurality of drive display units during the display time period, but the touch scanning signal sequentially applied to the second electrodes in the plurality of drive display units during the touch timing period), the touch operation and the display operation of the liquid crystal electronic curtain are performed in a time division manner. Additionally, the touch scanning signal is sequentially applied to a plurality block second electrode arranged along the second direction and connected with each other by the second electrode leads or the strip second electrode extending along the second direction, so that it does not need to separately detect a change of current signal flowing through each of the block first electrodes in the second direction, thereby saving the number of the first electrode leads, and reducing a space occupied by the first electrode leads, so as to easily arrange the first electrode leads.

When the detection circuits detect that a preset number of the current signals flowing through the plurality of block first electrodes connected with each other by the first electrode leads are changed or a preset number of the current signals flowing through strip first electrodes are changed, the whole liquid crystal electronic curtain is switched to the transparent state or the foggy state.

No additional component is added in the present embodiment, and the electrodes of the liquid crystal electronic curtain are utilized to control the liquid crystal electronic curtain to be opened and closed, and different regions of the liquid crystal electronic curtain can be separately controlled to be in the transparent state or the foggy state, thereby providing a user with convenience in use and improving user experience. Additionally, the electrodes of the present embodiment can reduce the number of the first electrode leads, and further reduce a space occupied by the first electrode lead, so as to easily arrange the first electrode leads.

Figure 8A:
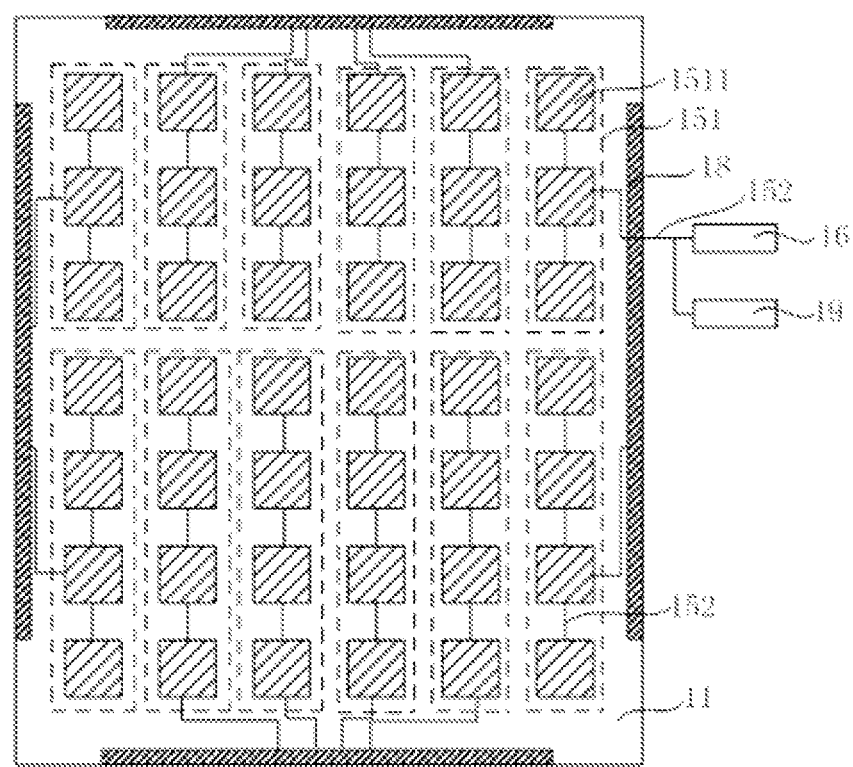
FIG. 8A is a top view of the first electrode layer of another liquid crystal electronic curtain provided by an embodiment of the present invention.
Figure 8B:
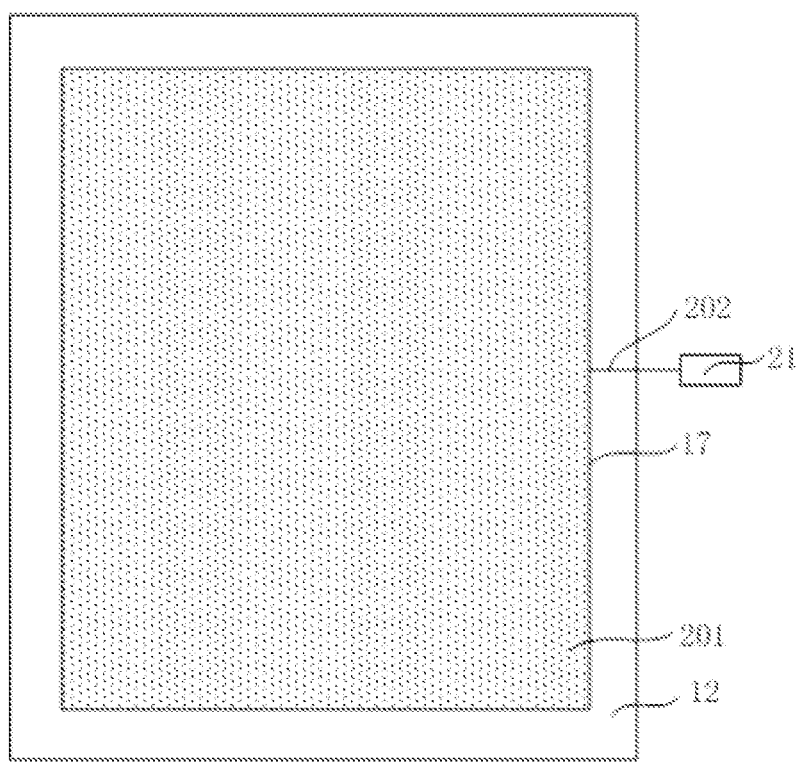
FIG. 8B is a top view of the second electrode layer of another liquid crystal electronic curtain provided by an embodiment of the present invention.

Referring to FIGS. 8A and 8B, FIG. 8A is a top view of the first electrode layer of another liquid crystal electronic curtain provided by an embodiment of the present invention, and FIG. 8B is a top view of the second electrode layer of another liquid crystal electronic curtain provided by an embodiment of the present invention. In the present embodiment, the liquid crystal electronic curtain includes: a first substrate 11, a second substrate 12 disposed opposite to the first substrate 11, and a liquid crystal layer between the first substrate 11 and the second substrate 12; a polarizer 14 (as shown in FIG. 1A) disposed on a side of the first substrate 11 that is away from the second substrate 12 or disposed on a side of the second substrate 12 that is away from the first substrate 11; a first electrode layer 15 disposed on a side of the first substrate 11 that faces the second substrate 12, the first electrode layer 15 includes a plurality of touch display units 151 disposed separately from each other and a plurality of first electrode leads 152, each of the first electrode leads 152 is connected with one of the touch display units 151, and the plurality of the touch display units 151 are respectively connected with a plurality of detection circuits 16 via the plurality of first electrode leads 152 which lead out from an edge of the first substrate 11; a second electrode layer 17 disposed on a side of the second substrate 12 that faces the first substrate 11; and a driving circuit 19 and a second electrode lead 172, with the driving circuit being connected with the second electrode lead.

Specifically, in the present embodiment, the touch display units 151 are respectively connected with the plurality of driving circuits 19 via the first electrode leads 152 leading out from the edge of the first substrate 11. That is, in the present embodiment, each of the touch display units 151 is connected with the detection circuit 16 and the driving circuit 19 by the first electrode lead 152.

Referring to FIG. 8B, FIG. 8B is a top view of the second electrode layer of another liquid crystal electronic curtain provided by an embodiment of the present invention. The second electrode layer 17 is disposed on a side of the second substrate 12 that faces the first substrate 11 (as shown in FIG. 1A), the second electrode layer 17 includes a planar common electrode 201 and a common electrode lead 202, and the common electrode 201 is connected with the common electrode driving circuit 21 by the common electrode lead 202 to apply a common voltage to the common electrode 201.

With the liquid crystal electronic curtain of the present embodiment, each of the touch display units is connected with the detection circuit and the driving circuit by the first electrode lead and the second electrode lead, respectively, and the change of current signal flowing through the touch display unit is determined by the detection circuit, so that a region touched in the liquid crystal electronic curtain is determined by the change of the current signal.

Figure 9:
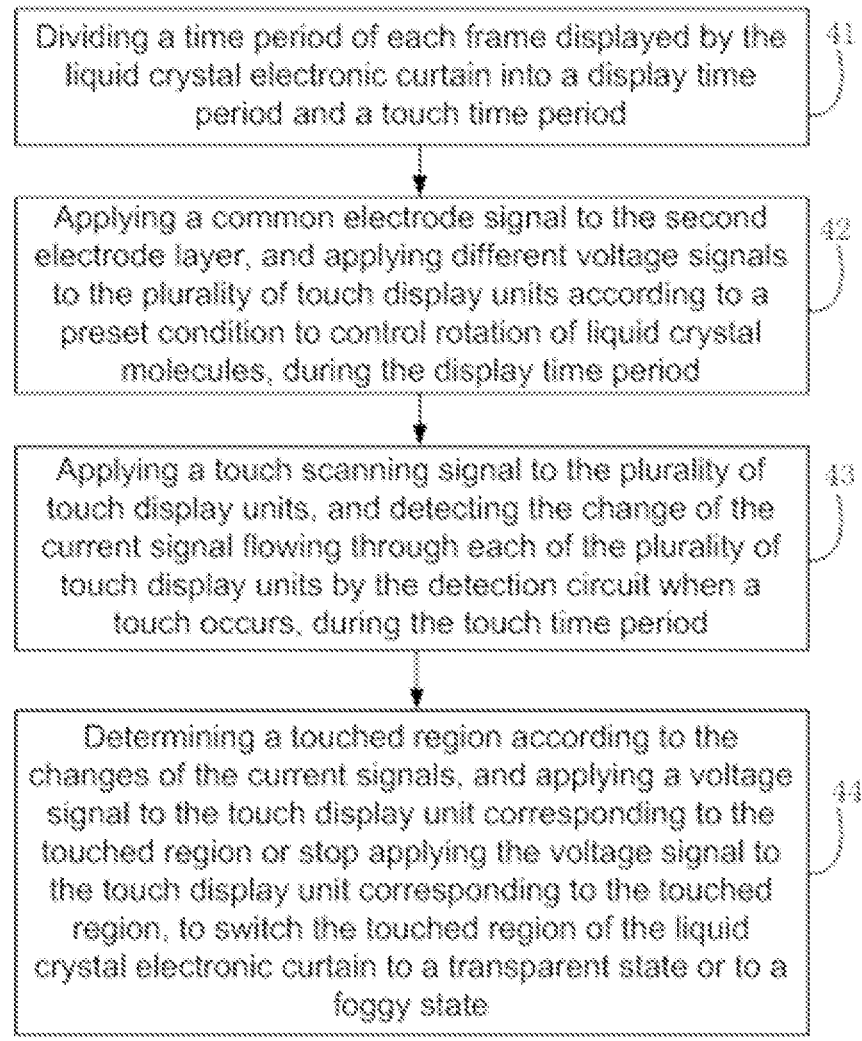
FIG. 9 is a flowchart of another driving method of a liquid crystal electronic curtain provided by the embodiment of the present invention.

An embodiment of the present invention further provides another driving method of a liquid crystal electronic curtain. Referring to FIG. 9, FIG. 9 is a flowchart of another driving method of a liquid crystal electronic curtain provided by the embodiment of the present invention, the liquid crystal electronic curtain is a liquid crystal electronic curtain shown in FIG. 8, and the driving method of the liquid crystal electronic curtain includes Steps S41 to S44 below.

At Step S41, dividing a time period of each frame displayed by the liquid crystal electronic curtain into a display time period and a touch time period.

At Step S42, applying a common electrode signal to the second electrode layer, and applying different voltage signals to the plurality of touch display units according to a preset condition to control rotation of liquid crystal molecules, during the display time period.

At Step S43, applying a touch scanning signal to the plurality of touch display units, and detecting the change of the current signal flowing through each of the plurality of touch display units by the detection circuit when a touch occurs, during the touch time period.

determining a touched region according to the change of the current signal, and applying a voltage signal to the touch display unit corresponding to the touched region or stop applying the voltage signal to the touch display unit corresponding to the touched region, to switch touched region of the liquid crystal electronic curtain to a transparent state or to a foggy state.

In another liquid crystal electronic curtain (the liquid crystal electronic curtain shown in FIG. 8) provided by an embodiment of the present invention, a common electrode is disposed on the second substrate. During the display time period, a common electrode signal is applied to the common electrode, and different voltage signals is applied to the first electrodes of the plurality of touch display units according to a preset condition to control rotation of liquid crystal molecules; during the touch time period, the touch display unit is multiplexed as the touch driving electrode, the touch scanning signal is simultaneously applied to the touch display units to charge the first electrodes in the touch display units. The touch scanning signal is an alternate voltage signal. The charged first electrode and the ground form a capacitor. When a finger touches the liquid crystal electronic curtain, the capacitance of the finger is added into the touched region of the liquid crystal electronic curtain, thereby increasing the capacitance of the touched region of the liquid crystal electronic curtain. When touch detection is performed, the change of the current signal flow through the first electrode in each of the touch display units is detected by the detection circuit in order to determine the touched region of the liquid crystal electronic curtain, and then a voltage signal is applied to the touch display unit corresponding to the touched region or the voltage signal is stopped applying to the touch display unit corresponding to the touched region, so switch the touched region of the liquid crystal electronic curtain to a transparent state or to a foggy state.

If the detection circuits detect that a preset number of the current signals flowing through the block first electrodes connected with each other by the first electrode leads are changed or a preset number of the current signals flowing through the strip first electrodes are changed, the whole liquid crystal electronic curtain is switched to the transparent state or the foggy state.

With the driving method of the liquid crystal electronic curtain provided by the present embodiment, the plurality of block first electrodes in the touch display units are multiplexed as the touch driving electrodes or the touch sensing electrodes, each of the touch display units is connected with one of the detection circuits by the first electrode lead, and connected with a driving circuit by the first electrode lead, and the touched region of the liquid crystal electronic curtain is detected in a self-capacitance manner, thereby achieving a touch function of the liquid crystal electronic curtain. No additional component is added in the present embodiment, and the electrodes of the liquid crystal electronic curtain are utilized to control the liquid crystal electronic curtain to be opened and closed, and different regions of the liquid crystal electronic curtain can be separately controlled to be in the transparent state or the foggy state, thereby providing a user with convenience in use and improving user experience.

It is noted that the preferable embodiments and the applied technology principles of the present disclosure are merely described as above. It should be understood for those skilled in the art that the present disclosure is not limited to particular embodiments described herein. Various apparent changes, readjustment and alternative can be made by those skilled in the art without departing the scope of protection of the present disclosure. Therefore, although the present disclosure is illustrated in detail through the above embodiments, the present disclosure is not merely limited to the above embodiments, and can further include more of other equivalent embodiments without departing the conception of the present disclosure. The scope of the present disclosure is subject to the appended claims.

What is claimed is:

1. A liquid crystal electronic curtain, comprising:
a first substrate;
a second substrate disposed opposite to the first substrate;
a liquid crystal layer between the first substrate and the second substrate;
a polarizer disposed on one of:
a side of the first substrate away from the second substrate, and
a side of the second substrate away from the first substrate;
a first electrode layer disposed on a side of the first substrate facing the second substrate, wherein the first electrode layer comprises:
a plurality of touch display units disposed separately from each other, and
a plurality of first electrode leads, wherein each of the first electrode leads is connected with one of the touch display units, and wherein the touch display units are connected with a plurality of detection circuits via the plurality of first electrode leads leading out from an edge of the first substrate;
a second electrode layer disposed on a side of the second substrate facing the first substrate;
a driving circuit; and
a second electrode lead, wherein the driving circuit is connected with the second electrode lead, and wherein the second electrode lead is connected to the second electrode layer;
wherein the first electrode layer further comprises:
a plurality of drive display units disposed separately from each other, and
a plurality of second electrode leads;
the plurality of drive display units are connected with a plurality of the driving circuits via the plurality of second electrode leads which lead out from the edge of the first substrate,
the plurality of drive display units are electrically insulated from the plurality of touch display units;
the second electrode layer comprises:
a planar common electrode, and
a common electrode lead; and
the planar common electrode is connected with a common electrode driving circuit by the common electrode lead.

2. The liquid crystal electronic curtain of claim 1, wherein at least one of:
the touch display unit comprises at least one block first electrode, and
the touch display unit comprises a plurality of block first electrodes connected with each other by the first electrode leads, and the plurality of touch display units are arranged as an array.

3. The liquid crystal electronic curtain of claim 1, wherein:
the touch display unit comprises a plurality of block first electrodes arranged along a first direction and connected with each other by the first electrode leads, and
the plurality of touch display units are arranged along a second direction perpendicular to the first direction.

4. The liquid crystal electronic curtain of claim 1, wherein:
the touch display unit comprises a strip first electrode extending along a first direction, and
the plurality of the touch display units are arranged along a second direction perpendicular to the first direction.

5. The liquid crystal electronic curtain of claim 1, wherein the drive display unit comprises:
at least one of:
a strip second electrode extending along a second direction, and
a plurality of block second electrodes arranged along the second direction and connected with each other by the second electrode lead; and
the plurality of drive display units are arranged along a first direction perpendicular to the second direction.

6. The liquid crystal electronic curtain of claim 1, wherein the touch display units are respectively connected with a plurality of driving circuits via the first electrode leads leading out from the edge of the first substrate.

7. A method of driving a liquid crystal electronic curtain, the liquid crystal electronic curtain comprises:
a first substrate;
a second substrate disposed opposite to the first substrate;
a liquid crystal layer between the first substrate and the second substrate;

a polarizer disposed on one of:
a side of the first substrate away from the second substrate, and
a side of the second substrate away from the first substrate;
a first electrode layer disposed on a side of the first substrate facing the second substrate, wherein the first electrode layer comprises:
a plurality of touch display units disposed separately from each other, and
a plurality of first electrode leads, wherein each of the first electrode leads is connected with one of the touch display units, and wherein the touch display units are connected with a plurality of detection circuits via the plurality of first electrode leads leading out from an edge of the first substrate;
a second electrode layer disposed on a side of the second substrate facing the first substrate;
a driving circuit; and
a second electrode lead, wherein the driving circuit is connected with the second electrode lead, and wherein the second electrode lead is connected to the second electrode layer,
wherein the first electrode layer further comprises:
a plurality of drive display units disposed separately from each other, and
a plurality of second electrode leads;
the plurality of drive display units are connected with a plurality of the driving circuits via the plurality of second electrode leads which lead out from the edge of the first substrate,
the plurality of drive display units are electrically insulated from the plurality of touch display units;
the second electrode layer comprises:
a planar common electrode, and
a common electrode lead; and
the planar common electrode is connected with a common electrode driving circuit by the common electrode lead;
the driving method comprises:
applying a common electrode signal to the second electrode layer,
applying different voltage signals to the plurality of touch display units according to a preset condition to control rotation of liquid crystal molecules of the liquid crystal layer,
detecting changes of current signals flowing through the touch display units by the detection circuits,
determining a touched region according to the changes of the current signals,
at least one of:
applying a voltage signal to the touch display unit corresponding to the touched region, and
stop applying the voltage signal to the touch display unit corresponding to the touched region,
to switch the touched region of the liquid crystal electronic curtain to a transparent state or to a foggy state.

8. The driving method of the liquid crystal electronic curtain of claim 7,
further comprises:
dividing a time period of each frame displayed by the liquid crystal electronic curtain into a display time period and a touch time period;
during the display time period, applying a common electrode signal to the second electrode layer, and applying different voltage signals to the plurality of touch display units and the plurality of drive display units according to a preset condition to control rotation of liquid crystal molecules,
during the touch time period:
applying a driving signal to the drive display unit, and
detecting the changes of the current signals flowing through the plurality of touch display units by the detection circuits when a touch occurs.

9. The driving method of the liquid crystal electronic curtain of claim 8, wherein the common electrode signal and the touch scanning signal are alternate current voltage signals.

10. The driving method of the liquid crystal electronic curtain of claim 7, wherein:
the plurality of the touch display units are respectively connected with a plurality of driving circuits via the second electrode leads leading out from the edge of the first substrate, and
the driving method comprises:
dividing a time period of each frame displayed by the liquid crystal electronic curtain into a display time period and a touch time period;
during the display time period:
applying a common electrode signal to the second electrode layer, and
applying different voltage signals to the plurality of touch display units according to a preset condition to control rotation of liquid crystal molecules, and
during the touch time period:
applying a touch scanning signal to the plurality of touch display units, and
detecting the change of the current signal flowing through each of the plurality of touch display units by the detection circuit when a touch occurs.

11. The driving method of the liquid crystal electronic curtain of claim 10, wherein the common electrode signal and the touch scanning signal are alternate current voltage signals.

12. The driving method of the liquid crystal electronic curtain of claim 7, wherein in response to the detection circuits detecting that at least a preset number of the current signals flowing through the touch display units change, the whole liquid crystal electronic curtain is switched to a transparent state or to a foggy state.

* * * * *